United States Patent
Gu et al.

(10) Patent No.: US 11,628,381 B2
(45) Date of Patent: Apr. 18, 2023

(54) CHROMATOGRAPHY MEDIA AND DEVICES

(71) Applicant: W. R. Grace & Co.-Conn., Columbia, MD (US)

(72) Inventors: Feng Gu, Ellicott City, MD (US); Ning Mu, Wuxi (CN)

(73) Assignee: W.R. GRACE & CO. CONN., Columbia, MD (US)

( * ) Notice: Subject to any disclaimer, the term of this patent is extended or adjusted under 35 U.S.C. 154(b) by 949 days.

(21) Appl. No.: 14/374,777

(22) PCT Filed: Sep. 16, 2013

(86) PCT No.: PCT/US2013/059984
§ 371 (c)(1),
(2) Date: Jul. 25, 2014

(87) PCT Pub. No.: WO2014/058570
PCT Pub. Date: Apr. 17, 2014

(65) Prior Publication Data
US 2014/0367338 A1    Dec. 18, 2014

Related U.S. Application Data

(60) Provisional application No. 61/702,165, filed on Sep. 17, 2012.

(51) Int. Cl.
*B01J 20/28* (2006.01)
*G01N 30/52* (2006.01)
(Continued)

(52) U.S. Cl.
CPC ......... *B01D 15/361* (2013.01); *B01D 15/265* (2013.01); *B01J 20/28004* (2013.01);
(Continued)

(58) Field of Classification Search
None
See application file for complete search history.

(56) References Cited

U.S. PATENT DOCUMENTS

| 3,505,785 A | 4/1970 | Kirkland |
| 3,526,603 A | 9/1970 | Acker ................... B01J 11/36 |

(Continued)

FOREIGN PATENT DOCUMENTS

| CA | 1303594 C | 6/1992 |
| CA | 2564413 | 12/2005 |

(Continued)

OTHER PUBLICATIONS

Elvers et all; "Ullmann's Encyclopaedia of Industrial Chemistry;" vol. A23, (1993), Chapter 6.
(Continued)

*Primary Examiner* — Kara M Peo
(74) *Attorney, Agent, or Firm* — Foley & Lardner LLP

(57) ABSTRACT

Chromatography devices contain chromatography media and methods of making and methods of using chromatography devices. Chromatography devices enable a more efficient, productive and/or environmentally friendly chromatographic operation due to one or more of the following advantages over conventional chromatographic operations: elimination of a device packing step by the user; elimination of clean-in-place (CIP) steps; elimination of clean-in-place (CIP) steps utilizing sodium hydroxide solution; elimination of any validation steps by the user; and use of a chromatography device comprising biodegradable material. The chromatography media includes porous inorganic particles having a functionalized surface and having a median pore size of at least about 300 Angstroms (A), or at least about 300 A up to about 3000 A. The inorganic particles may have (Continued)

a BET surface area of at least about 20 m2/g, or at least about 25 m2/g, or about 30 m2/g, up to about 2000 m2/g.

2 Claims, 8 Drawing Sheets

(51) Int. Cl.
  *B01J 20/32* (2006.01)
  *B01D 15/36* (2006.01)
  *B01J 39/26* (2006.01)
  *B01J 41/20* (2006.01)
  *B01D 15/26* (2006.01)
  *B01J 20/289* (2006.01)

(52) U.S. Cl.
  CPC ....... *B01J 20/289* (2013.01); *B01J 20/28057* (2013.01); *B01J 20/28069* (2013.01); *B01J 20/28078* (2013.01); *B01J 20/28088* (2013.01); *B01J 20/3204* (2013.01); *B01J 20/3219* (2013.01); *B01J 20/3272* (2013.01); *B01J 20/3274* (2013.01); *B01J 39/26* (2013.01); *B01J 41/20* (2013.01); *G01N 30/52* (2013.01); *G01N 2030/525* (2013.01); *Y10T 29/49* (2015.01); *Y10T 29/49764* (2015.01)

(56) References Cited

U.S. PATENT DOCUMENTS

| | | | |
|---|---|---|---|
| 3,652,216 A | 3/1972 | Krekeler et al. | 23/182 |
| 3,782,075 A | 1/1974 | Kirkland | 55/67 |
| 3,855,172 A | 12/1974 | Iler et al. | 260/39 R |
| 3,869,409 A | 3/1975 | Bebris et al. | 252/446 |
| 3,888,972 A | 6/1975 | Kiselev et al. | 423/338 |
| 3,904,598 A | 9/1975 | Isaac | 260/210.5 |
| 3,943,072 A | 3/1976 | Thomson et al. | 252/455 R |
| 3,956,179 A | 5/1976 | Sebastian et al. | 252/430 |
| 3,975,293 A | 8/1976 | LePage | 252/317 |
| 3,984,349 A | 10/1976 | Meiler et al. | 252/428 |
| 4,010,242 A | 3/1977 | Iler et al. | 423/335 |
| 4,029,583 A | 6/1977 | Ho Chang et al. | 252/184 |
| 4,034,139 A | 7/1977 | Mazarguil et al. | 428/405 |
| 4,061,828 A | 12/1977 | Mazarguil et al. | 428/403 |
| 4,070,286 A | 1/1978 | Iler et al. | 210/31 C |
| 4,076,651 A | 2/1978 | Jacques | 252/451 |
| 4,100,149 A | 7/1978 | Meller et al. | 260/112 R |
| 4,104,363 A | 8/1978 | Vozka et al. | 423/338 |
| 4,118,316 A | 10/1978 | Talley et al. | 210/31 C |
| 4,124,699 A | 11/1978 | Michel et al. | 423/628 |
| 4,131,542 A | 12/1978 | Bergna et al. | 210/31 |
| 4,140,653 A | 2/1979 | Imura et al. | 252/430 |
| 4,157,920 A | 6/1979 | Wason et al. | 106/292 |
| 4,168,216 A | 9/1979 | Burkhardt et al. | 204/98 |
| 4,170,685 A | 10/1979 | Rembaum et al. | 428/402 |
| 4,229,342 A | 1/1980 | Mirabel | 260/120 |
| 4,199,450 A | 4/1980 | Dulout et al. | 210/31 |
| 4,275,300 A | 6/1981 | Abbott | 250/304 |
| 4,298,500 A | 11/1981 | Abbott | 252/428 |
| 4,308,254 A | 12/1981 | Tayot et al. | 424/124 |
| 4,322,542 A | 3/1982 | Abbott | 556/425 |
| 4,329,434 A | 5/1982 | Kimoto et al. | 521/27 |
| 4,329,435 A | 5/1982 | Kimoto et al. | 521/38 |
| 4,376,140 A | 3/1983 | Kimoto et al. | 427/244 |
| 4,397,827 A | 8/1983 | Chu | 423/326 |
| 4,415,631 A | 11/1983 | Schutijser | |
| 4,496,461 A | 1/1985 | Leeke et al. | 210/198.2 |
| 4,517,131 A | 5/1985 | Hefner, Jr. | 260/465 F |
| 4,532,232 A | 7/1985 | Larsson et al. | |
| 4,536,352 A | 8/1985 | Kimoto et al. | 260/543 |
| 4,540,486 A | 9/1985 | Ramsden | 210/198.2 |
| 4,551,245 A | 11/1985 | Ramsden et al. | 210/198.2 |
| 4,569,917 A | 2/1986 | Maler et al. | 436/71 |
| 4,576,927 A | 3/1986 | Kuroda et al. | |
| 4,581,428 A | 4/1986 | Farnham et al. | 526/190 |
| 4,597,913 A | 7/1986 | Kimoto et al. | 558/436 |
| 4,606,825 A | 8/1986 | Crane et al. | 210/635 |
| 4,639,513 A | 1/1987 | Hou et al. | 530/387 |
| 4,640,909 A | 2/1987 | Ramsden et al. | 502/407 |
| 4,648,975 A | 3/1987 | Barkatt et al. | 210/656 |
| 4,650,784 A | 3/1987 | Ramsden et al. | 502/407 |
| 4,661,248 A | 4/1987 | Ramsden et al. | 210/198.2 |
| 4,673,734 A | 6/1987 | Tayot et al. | 530/364 |
| 4,676,898 A | 6/1987 | Saxena | 210/198.2 |
| 4,699,717 A | 10/1987 | Riesner et al. | 210/635 |
| 4,704,374 A | 11/1987 | Jacques | 502/8 |
| 4,724,207 A | 2/1988 | Hou et al. | 435/180 |
| 4,724,210 A | 2/1988 | Oka et al. | 435/239 |
| 4,732,887 A | 3/1988 | Obanawa et al. | 502/402 |
| 4,740,298 A | 4/1988 | Andresen et al. | 210/198.3 |
| 4,745,097 A | 5/1988 | Maekawa et al. | 503/209 |
| 4,746,572 A | 5/1988 | Glajch et al. | 428/403 |
| 4,756,834 A | 7/1988 | Muller et al. | 210/635 |
| 4,780,423 A | 10/1988 | Bluestein et al. | 436/527 |
| 4,783,264 A | 11/1988 | Nylen et al. | 210/638 |
| 4,851,382 A | 7/1989 | Kusano et al. | 502/401 |
| 4,855,054 A | 8/1989 | Williams | 210/635 |
| 4,895,806 A | 1/1990 | Le et al. | 435/288 |
| 4,917,781 A | 4/1990 | Sharifian et al. | 204/72 |
| 4,923,978 A | 5/1990 | McCormick | 536/27 |
| 4,950,634 A | 8/1990 | Williams et al. | 502/401 |
| 4,956,180 A | 9/1990 | Cassani et al. | 424/118 |
| 4,959,340 A | 9/1990 | Williams | B01J 20/22 |
| 4,990,456 A | 2/1991 | Loucks et al. | 436/139 |
| 5,004,688 A | 4/1991 | Craig et al. | 435/69.3 |
| 5,009,688 A | 4/1991 | Nakanishi | 65/18.3 |
| 5,030,286 A | 7/1991 | Crawford et al. | 106/435 |
| 5,032,266 A | 7/1991 | Kirkland et al. | 210/198.2 |
| 5,035,803 A | 7/1991 | Cohen | 210/656 |
| 5,057,426 A | 10/1991 | Henco et al. | 435/270 |
| 5,059,654 A | 10/1991 | Hou et al. | |
| 5,085,779 A | 2/1992 | Crane et al. | 210/635 |
| 5,087,359 A | 2/1992 | Kakodkar et al. | 210/198.2 |
| 5,091,433 A | 2/1992 | Wulff et al. | 521/54 |
| 5,092,992 A | 3/1992 | Crane et al. | 210/198.2 |
| 5,099,923 A | 3/1992 | Aften et al. | 166/294 |
| 5,128,291 A | 7/1992 | Wax et al. | 502/8 |
| 5,141,806 A | 8/1992 | Koontz | 428/315.5 |
| 5,149,425 A | 9/1992 | Mazid et al. | 210/198.2 |
| 5,149,553 A | 9/1992 | Berg | 426/330.4 |
| 5,151,350 A | 9/1992 | Colbert et al. | 435/69.1 |
| 5,152,906 A | 10/1992 | Aften et al. | 252/8.551 |
| 5,190,660 A | 3/1993 | Lindoy et al. | 210/670 |
| 5,190,844 A | 3/1993 | Yabuuchi et al. | 430/137 |
| 5,203,991 A | 4/1993 | Kutsuna et al. | 210/198.2 |
| 5,230,833 A | 7/1993 | Romberger et al. | 252/363.5 |
| 5,268,097 A | 12/1993 | Girot et al. | 502/402 |
| 5,318,848 A | 6/1994 | Itoh et al. | 428/405 |
| 5,354,548 A | 10/1994 | Araya et al. | 423/700 |
| 5,372,820 A | 12/1994 | Jozefonvicz nee Dorgebray et al. | 424/499 |
| 5,380,706 A | 1/1995 | Himes et al. | 507/129 |
| 5,401,809 A | 3/1995 | Gitzel et al. | 525/337 |
| 5,431,807 A | 7/1995 | Frechet et al. | 210/198.2 |
| 5,447,859 A | 9/1995 | Prussak | 435/239 |
| 5,451,660 A | 9/1995 | Builder et al. | 530/344 |
| 5,453,186 A | 9/1995 | Muller et al. | 210/198.2 |
| 5,468,847 A | 11/1995 | Heilmann et al. | 530/413 |
| 5,480,542 A | 1/1996 | Asakawa et al. | 210/198.2 |
| 5,510,394 A | 4/1996 | Hodgdon | 521/27 |
| 5,512,169 A | 4/1996 | Williams | 210/198.2 |
| 5,593,576 A | 1/1997 | Girot et al. | 210/198.2 |
| 5,593,757 A | 1/1997 | Kashiwazaki et al. | 428/195 |
| 5,610,274 A | 3/1997 | Wong | 530/334 |
| 5,622,743 A | 4/1997 | Tanaka et al. | |
| 5,624,875 A | 4/1997 | Nakanishi et al. | 501/39 |
| 5,633,290 A | 5/1997 | Frechet et al. | 521/54 |
| 5,652,348 A | 7/1997 | Burton et al. | 536/20 |
| 5,674,932 A | 10/1997 | Agostini et al. | 524/430 |
| 5,701,956 A | 12/1997 | Hardy et al. | 166/295 |
| 5,707,516 A | 1/1998 | Tomizawa et al. | 210/198.2 |
| 5,710,264 A | 1/1998 | Urdea et al. | 536/23.1 |
| 5,759,405 A | 6/1998 | Anderson et al. | 210/656 |
| 5,805,264 A | 9/1998 | Janssen et al. | 351/160 R |

(56) References Cited

U.S. PATENT DOCUMENTS

| | | | |
|---|---|---|---|
| 5,808,041 A | 9/1998 | Padhye et al. ............... 536/25.4 |
| 5,856,379 A | 1/1999 | Shiratsuchi et al. |
| 5,861,134 A | 1/1999 | Swanson ...................... 423/335 |
| 5,888,397 A | 3/1999 | Rogers et al. ................ 210/634 |
| 5,904,848 A | 5/1999 | Wong et al. ............. 210/500.36 |
| 5,906,747 A | 5/1999 | Coffman et al. .............. 210/635 |
| 5,911,963 A | 6/1999 | Krivak et al. ................ 423/335 |
| 5,914,044 A | 6/1999 | Lindoy et al. ................ 210/670 |
| 5,922,449 A | 7/1999 | Revis ......................... 428/306.6 |
| 5,945,525 A | 8/1999 | Uematsu et al. .......... 536/25.42 |
| 5,948,894 A | 9/1999 | Berry et al. ................ 530/391.1 |
| 5,968,652 A | 10/1999 | Hanggi et al. ................. 428/405 |
| 5,970,915 A | 10/1999 | Schlueter et al. ............. 119/171 |
| 5,973,068 A | 10/1999 | Yamaya et al. |
| 5,976,479 A | 11/1999 | Alcaraz et al. ............... 423/335 |
| 6,027,945 A | 2/2000 | Smith et al. .................. 436/526 |
| 6,037,465 A | 3/2000 | Hillebrand et al. ........ 536/25.42 |
| 6,043,354 A | 3/2000 | Hillebrand et al. ........ 536/25.42 |
| 6,074,555 A | 6/2000 | Boos et al. .................. 210/198.2 |
| 6,090,288 A | 7/2000 | Berglund et al. |
| 6,127,526 A | 10/2000 | Blank et al. .................. 530/413 |
| 6,168,773 B1 | 1/2001 | Sharp et al. ................... 423/335 |
| 6,171,486 B1 | 1/2001 | Green et al. ................ 210/198.2 |
| 6,204,306 B1 | 3/2001 | Chabrecek et al. ........... 523/106 |
| 6,248,911 B1 | 6/2001 | Canessa et al. ............... 554/191 |
| 6,284,470 B1 | 9/2001 | Bitner et al. ...................... 435/6 |
| 6,310,199 B1 | 10/2001 | Smith et al. .................. 536/25.4 |
| 6,355,726 B1 | 3/2002 | Doemling et al. ........... 525/54.1 |
| 6,362,320 B1 | 3/2002 | Park et al. ..................... 530/412 |
| 6,372,353 B2 | 4/2002 | Karger et al. ................. 428/447 |
| 6,376,194 B2 | 4/2002 | Smith et al. ....................... 435/6 |
| 6,379,500 B2 | 4/2002 | Greenwood et al. ....... 162/181.6 |
| 6,383,990 B1 | 5/2002 | Dawson et al. ............... 507/209 |
| 6,387,974 B1 | 5/2002 | Deissler et al. ............... 521/150 |
| 6,426,315 B1 | 7/2002 | Bergstrom et al. |
| 6,428,707 B1 | 8/2002 | Berg et al. ..................... 210/661 |
| 6,435,012 B2 | 8/2002 | Maikner et al. .............. 73/61.52 |
| 6,472,486 B2 | 10/2002 | Klaerner et al. .............. 526/220 |
| 6,482,324 B2 | 11/2002 | Kirkland et al. .............. 210/656 |
| 6,488,855 B2 | 12/2002 | Gjerde et al. .................. 210/635 |
| 6,497,964 B1 | 12/2002 | Matsumura et al. .......... 428/447 |
| 6,512,060 B1 | 1/2003 | Matyjaszewski et al. .... 526/111 |
| 6,537,793 B2 | 3/2003 | Blanche et al. ............... 435/239 |
| 6,555,151 B2 | 4/2003 | Hu et al. ........................ 426/422 |
| 6,565,905 B1 | 5/2003 | Ito et al. ..................... 426/330.4 |
| 6,569,910 B1 | 5/2003 | Spindler et al. ................. 521/30 |
| 6,596,843 B2 | 7/2003 | Brunelle et al. ............... 528/486 |
| 6,620,326 B1 | 9/2003 | Lihme et al. .................. 210/635 |
| 6,624,205 B2 | 9/2003 | Muranaka ........................ 521/25 |
| 6,632,848 B2 | 10/2003 | Sugaya ............................ 521/27 |
| 6,649,572 B2 | 11/2003 | Dawson et al. ............... 507/209 |
| 6,797,814 B2 | 9/2004 | Blank ............................. 530/413 |
| 6,802,966 B2 | 10/2004 | Wormsbecher ............. 210/198.2 |
| 6,818,259 B1 | 11/2004 | Koontz ........................... 427/562 |
| 6,852,009 B2 | 2/2005 | Kawase et al. .................. 431/36 |
| 6,861,103 B2 | 3/2005 | Chang et al. .................. 427/522 |
| 6,911,192 B2 | 6/2005 | Nakanishi ..................... 423/338 |
| 6,916,536 B1 | 7/2005 | Hammen et al. .............. 428/407 |
| 6,949,613 B2 | 9/2005 | Haddleton ...................... 526/90 |
| 6,972,090 B2 | 12/2005 | Boschetti et al. ........... 210/198.2 |
| 6,994,791 B2 | 2/2006 | Muller et al. ................. 210/656 |
| 6,994,964 B1 | 2/2006 | Chang et al. ....................... 435/6 |
| 6,998,040 B2 | 2/2006 | Malik et al. ................. 210/198.2 |
| 6,998,042 B2 | 2/2006 | Wormsbecher ............. 210/198.2 |
| 7,008,542 B2 | 3/2006 | Belew et al. |
| 7,012,044 B2 | 3/2006 | Dawson et al. ............... 507/211 |
| 7,015,281 B2 | 3/2006 | Britsch et al. ................... 525/61 |
| 7,033,505 B2 | 4/2006 | Urano ............................ 210/656 |
| 7,067,059 B2 | 6/2006 | Maloisel ........................ 210/635 |
| 7,074,491 B2 | 7/2006 | Liu et al. ....................... 428/447 |
| 7,078,224 B1 | 7/2006 | Bitner et al. ................... 435/270 |
| 7,125,488 B2 | 10/2006 | Li .................................. 210/198.2 |
| 7,128,884 B2 | 10/2006 | Kirkland et al. .............. 423/335 |
| 7,166,213 B2 | 1/2007 | Wormsbecher ............. 210/198.2 |
| 7,192,560 B2 | 3/2007 | Parthasarathy et al. ...... 422/101 |
| 7,198,855 B2 | 4/2007 | Liebmann-Vinson et al. ............... 428/447 |
| 7,220,703 B2 | 5/2007 | Hammen et al. .............. 502/405 |
| 7,229,655 B2 | 6/2007 | Hu et al. ........................ 426/422 |
| 7,250,214 B2 | 7/2007 | Walter et al. .................. 428/405 |
| 7,250,253 B1 | 7/2007 | Klapproth et al. ................ 435/6 |
| 7,316,919 B2 | 1/2008 | Childs et al. .................. 435/177 |
| 7,318,900 B2 | 1/2008 | DeMarco ...................... 210/656 |
| 7,323,347 B2 | 1/2008 | Quinn ............................ 436/518 |
| 7,329,386 B2 | 2/2008 | Kobayashi et al. ............. 422/70 |
| 7,332,327 B2 | 2/2008 | Vikholm et al. ........... 435/287.2 |
| 7,338,768 B1 | 3/2008 | Trau et al. ....................... 435/7.1 |
| 7,374,684 B2 | 5/2008 | Gibson et al. ................. 210/636 |
| 7,375,168 B2 | 5/2008 | Zhang et al. .................. 525/474 |
| 7,378,479 B2 | 5/2008 | Tamareselvy et al. ........ 526/333 |
| 7,390,403 B2 | 6/2008 | Siwak ........................ 210/198.2 |
| 7,396,561 B2 | 7/2008 | Ruhe .............................. 427/214 |
| 7,456,276 B2 | 11/2008 | Christensen et al. ....... 536/123.1 |
| 7,476,474 B2 | 1/2009 | Ganguli et al. ................... 430/5 |
| 7,479,223 B2 | 1/2009 | DiLeo et al. ................ 210/198.2 |
| 7,482,169 B2 | 1/2009 | Gjerde et al. .................. 436/178 |
| 7,534,623 B2 | 5/2009 | Landers et al. ............... 436/177 |
| 7,560,258 B2 | 7/2009 | Brueggmeier et al. ........ 435/174 |
| 7,608,234 B2 | 10/2009 | Stenzel et al. ................. 423/335 |
| 7,671,203 B2 | 3/2010 | Antonini ......................... 546/44 |
| 7,674,835 B2 | 3/2010 | Rasmussen et al. ............ 521/31 |
| 7,683,011 B2 | 3/2010 | Putzig ............................ 507/273 |
| 7,692,013 B2 | 4/2010 | Antonini |
| 7,714,112 B2 | 5/2010 | Engstrand et al. ......... 530/390.5 |
| 7,732,383 B2 | 6/2010 | Putzig ............................ 507/271 |
| 7,736,612 B2 | 6/2010 | Kubota .......................... 423/335 |
| 7,745,582 B2 | 6/2010 | Lihme et al. ............... 530/387.1 |
| 7,754,660 B2 | 7/2010 | Putzig ............................ 507/271 |
| RE41,595 E | 8/2010 | Shandie et al. ................ 210/635 |
| 7,780,946 B2 | 8/2010 | Wormsbecher et al. ...... 423/659 |
| 7,790,657 B2 | 9/2010 | Putzig ............................ 507/273 |
| 7,795,189 B2 | 9/2010 | Putzig ............................ 507/271 |
| 7,795,190 B2 | 9/2010 | Putzig ............................ 507/273 |
| 7,824,548 B2 | 11/2010 | DiLeo ......................... 210/198.2 |
| 7,851,417 B2 | 12/2010 | Putzig ............................ 507/271 |
| 7,875,317 B2 | 1/2011 | Nakagawa et al. ........... 427/387 |
| 7,897,051 B2 | 3/2011 | Sohling et al. ................ 210/670 |
| 7,919,177 B2 | 4/2011 | Jiang et al. .................. 428/304.4 |
| 7,922,908 B2 | 4/2011 | Allington et al. ............. 210/635 |
| 7,943,046 B2 | 5/2011 | Martosella et al. ........... 210/635 |
| 7,960,311 B2 | 6/2011 | Carlson ............................ 506/13 |
| 7,994,092 B2 | 8/2011 | Gorkovenko et al. ........ 502/404 |
| 8,197,782 B2 | 6/2012 | DeVera .......................... 423/339 |
| 8,242,050 B2 | 8/2012 | Lu et al. ......................... 502/407 |
| 8,481,298 B2 | 7/2013 | Andersson et al. ........... 435/239 |
| 8,551,894 B2 | 10/2013 | Seshadri et al. ................. 442/63 |
| 8,658,277 B2 | 2/2014 | Wyndham et al. |
| 8,673,988 B2 | 3/2014 | Graalfs et al. .................. 521/32 |
| 8,791,220 B2 | 7/2014 | Jiang et al. |
| 2002/0006493 A1 | 1/2002 | Chabrecek et al. ......... 428/64.1 |
| 2002/0012982 A1 | 1/2002 | Blakesley et al. ............ 435/183 |
| 2002/0028520 A1 | 3/2002 | Boschetti et al. ............. 436/518 |
| 2002/0043499 A1 | 4/2002 | Hammen et al. .............. 210/656 |
| 2002/0127587 A1 | 9/2002 | Simms et al. ...................... 435/6 |
| 2002/0166816 A1 | 11/2002 | Allen et al. .................... 210/856 |
| 2003/0017464 A1 | 1/2003 | Pohl .................................. 435/6 |
| 2003/0075508 A1 | 4/2003 | Woodruff et al. ............. 210/683 |
| 2003/0108879 A1 | 6/2003 | Klaerner et al. ................... 435/6 |
| 2003/0171443 A1 | 9/2003 | Erbacher ......................... 521/27 |
| 2003/0187227 A1 | 10/2003 | Lihme et al. ............... 530/387.1 |
| 2003/0201229 A1 | 10/2003 | Siwak et al. ................... 210/650 |
| 2003/0225261 A1 | 12/2003 | Taylor et al. ................ 536/25.5 |
| 2004/0028901 A1 | 2/2004 | Rumpf et al. .................. 428/375 |
| 2004/0058059 A1 | 3/2004 | Linford ............................ 427/58 |
| 2004/0091411 A1 | 5/2004 | Modrek-Najafabadi ..... 423/338 |
| 2004/0127648 A1 | 7/2004 | Guerrer et al. ................ 525/227 |
| 2004/0159611 A1 | 8/2004 | Urano ............................ 210/656 |
| 2004/0203308 A1 | 10/2004 | Ko et al. |
| 2004/0211724 A1 | 10/2004 | Gibson et al. ................. 210/638 |
| 2004/0224843 A1 | 11/2004 | Hammen et al. .............. 502/402 |
| 2004/0266896 A1 | 12/2004 | Britsch et al. ................... 521/38 |
| 2005/0029196 A1 | 2/2005 | Rhemrev-Boom ........... 210/656 |
| 2005/0100905 A1 | 5/2005 | Nassoy et al. ..................... 435/6 |
| 2005/0106602 A1 | 5/2005 | Akhavan-Tafti ................. 435/6 |

(56) References Cited

U.S. PATENT DOCUMENTS

| | | |
|---|---|---|
| 2005/0115903 A1 | 6/2005 | Hallier-Soulier et al. ..... 210/656 |
| 2005/0200025 A1 | 9/2005 | Casey et al. ................. 257/762 |
| 2005/0269257 A1 | 12/2005 | Voute et al. ............... 210/502.1 |
| 2005/0282294 A1 | 12/2005 | Britsch ........................ 436/514 |
| 2006/0041035 A1 | 2/2006 | Poppe et al. .................. 523/200 |
| 2006/0058181 A1 | 3/2006 | Margetts ....................... 502/159 |
| 2006/0105391 A1 | 5/2006 | Engel et al. .................... 435/7.1 |
| 2006/0120683 A1 | 6/2006 | Kamp et al. .................. 385/141 |
| 2006/0144770 A1 | 7/2006 | Granger et al. ........... 210/198.2 |
| 2006/0147344 A1 | 7/2006 | Ahn et al. ....................... 422/70 |
| 2006/0180549 A1 | 8/2006 | Liu et al. ...................... 210/656 |
| 2006/0240633 A1 | 10/2006 | Martosella et al. .......... 438/348 |
| 2007/0112178 A1 | 5/2007 | Johansson et al. ........ 530/387.1 |
| 2007/0135304 A1 | 6/2007 | Walter et al. |
| 2007/0141325 A1 | 6/2007 | O'Gara et al. ................ 428/332 |
| 2007/0178465 A1 | 8/2007 | Sudor et al. ...................... 435/6 |
| 2007/0181482 A1 | 8/2007 | Abudokirim et al. ..... 210/321.6 |
| 2007/0193954 A1 | 8/2007 | Busson ......................... 210/656 |
| 2007/0215547 A1 | 9/2007 | O'Gara ......................... 210/656 |
| 2007/0276131 A1 | 11/2007 | Ferre et al. .................... 530/420 |
| 2008/0017579 A1 | 1/2008 | Hermansson et al. ........ 210/656 |
| 2008/0025900 A1 | 1/2008 | Mori ............................. 423/335 |
| 2008/0026486 A1 | 1/2008 | Cooper et al. ................. 436/518 |
| 2008/0033103 A1 | 2/2008 | Kameda et al. ............... 524/571 |
| 2008/0038750 A1 | 2/2008 | Piehler et al. .................. 435/7.1 |
| 2008/0053908 A1 | 3/2008 | Chordia et al. ............... 210/656 |
| 2008/0071003 A1 | 3/2008 | Sellergren et al. |
| 2008/0116122 A1 | 5/2008 | Wheelwright et al. ......... 210/37 |
| 2008/0146454 A1 | 6/2008 | Cuppoletti et al. ............... 506/6 |
| 2008/0153100 A1 | 6/2008 | Rank et al. ......................... 435/6 |
| 2008/0154029 A1 | 6/2008 | Balayan et al. .............. 536/25.4 |
| 2008/0164211 A1 | 7/2008 | Lindner et al. |
| 2008/0210615 A1 | 9/2008 | Joehnck et al. ........... 210/198.2 |
| 2008/0213906 A1 | 9/2008 | Aurand et al. .................. 436/63 |
| 2008/0223794 A1 | 9/2008 | Yamamichi et al. ......... 210/767 |
| 2008/0236824 A1 | 10/2008 | Putzig ......................... 166/280.1 |
| 2008/0249326 A1 | 10/2008 | Nakajima et al. ............. 556/410 |
| 2008/0269368 A1 | 10/2008 | Wyndham et al. ........... 521/154 |
| 2008/0269475 A1 | 10/2008 | Sohling ........................ 536/25.4 |
| 2008/0277346 A1 | 11/2008 | Kirkland et al. .............. 210/656 |
| 2008/0293959 A1 | 11/2008 | Liu et al. ...................... 556/449 |
| 2008/0311681 A1 | 12/2008 | Johannsen et al. ........... 436/548 |
| 2009/0035876 A1 | 2/2009 | Williams et al. ............. 436/529 |
| 2009/0048439 A1 | 2/2009 | Weisburg et al. ......... 536/25.41 |
| 2009/0056541 A1 | 3/2009 | Davison et al. .................. 95/88 |
| 2009/0062519 A1 | 3/2009 | Okamoto et al. ............... 536/20 |
| 2009/0074709 A1 | 3/2009 | Koepsel et al. ............. 424/78.32 |
| 2009/0127501 A1 | 5/2009 | Kashima ...................... 252/79.5 |
| 2009/0151946 A1 | 6/2009 | Putzig ......................... 166/280.2 |
| 2009/0151947 A1 | 6/2009 | Putzig ......................... 166/280.2 |
| 2009/0170973 A1 | 7/2009 | Mattiasson et al. .......... 521/134 |
| 2009/0186093 A1 | 7/2009 | Liu et al. ...................... 424/497 |
| 2009/0192342 A1 | 7/2009 | Coupard et al. .............. 585/533 |
| 2009/0197332 A1 | 8/2009 | Andreou et al. .............. 435/174 |
| 2009/0206034 A1 | 8/2009 | Nakajima ..................... 210/635 |
| 2009/0211453 A1 | 8/2009 | Nassivera et al. ............... 96/153 |
| 2009/0221809 A1 | 9/2009 | Sohling et al. .............. 536/25.4 |
| 2009/0232950 A1 | 9/2009 | Brothers, Jr. et al. |
| 2009/0246885 A1 | 10/2009 | Blan et al. .................... 436/501 |
| 2009/0277838 A1 | 11/2009 | Liu et al. ...................... 210/656 |
| 2009/0294362 A1 | 12/2009 | Persson et al. ............... 210/656 |
| 2009/0297853 A1 | 12/2009 | Kirkland et al. .............. 428/403 |
| 2009/0306292 A1 | 12/2009 | Bendejacq et al. ............. 525/55 |
| 2009/0308599 A1 | 12/2009 | Dusterhoft et al. ........... 166/249 |
| 2009/0308811 A1 | 12/2009 | Tepper et al. ................. 210/656 |
| 2010/0029794 A1 | 2/2010 | Yilmaz et al. .................. 521/63 |
| 2010/0055667 A1 | 3/2010 | Hage et al. |
| 2010/0099579 A1 | 4/2010 | Chikoti et al. .................. 506/16 |
| 2010/0116743 A1 | 5/2010 | Pryor et al. |
| 2010/0129830 A1 | 5/2010 | Deshayes et al. .............. 435/7.1 |
| 2010/0132251 A1 | 6/2010 | Sohling et al. .................. 44/388 |
| 2010/0156135 A1 | 6/2010 | Guckel et al. ................. 424/9.1 |
| 2010/0159254 A1 | 6/2010 | Oertli et al. ................... 428/447 |
| 2010/0181254 A1 | 7/2010 | Graalfs ......................... 210/656 |
| 2010/0237019 A1 | 9/2010 | Aldegonda et al. .......... 210/670 |
| 2010/0255310 A1 | 10/2010 | Chen ............................ 428/403 |
| 2010/0272996 A1 | 10/2010 | Homes et al. ................ 428/402 |
| 2010/0310539 A1 | 12/2010 | Garcia-Bennett |
| 2010/0310865 A1 | 12/2010 | Kumar et al. ................. 428/352 |
| 2011/0049042 A1 | 3/2011 | DiLeo et al. .................. 210/490 |
| 2011/0049056 A1 | 3/2011 | Wyndham et al. ........... 210/656 |
| 2011/0065901 A1 | 3/2011 | Soice et al. ................. 530/388.1 |
| 2011/0100915 A1 | 5/2011 | Kanda et al. ................. 210/656 |
| 2011/0121229 A1 | 5/2011 | Linder et al. ................. 252/184 |
| 2011/0139717 A1 | 6/2011 | Malenfant et al. ........... 210/656 |
| 2011/0160104 A1 | 6/2011 | Wu et al. ...................... 507/269 |
| 2011/0162153 A1 | 7/2011 | Niembro et al. ................. 8/142 |
| 2011/0186519 A1 | 8/2011 | Balayan et al. .............. 210/660 |
| 2011/0201078 A1 | 8/2011 | Rasmussen et al. |
| 2011/0245077 A1 | 10/2011 | Anderson et al. ............ 502/402 |
| 2011/0284465 A1 | 11/2011 | Liu et al. ...................... 210/656 |
| 2011/0313147 A1 | 12/2011 | Boshchetti et al. ............ 536/56 |
| 2011/0313712 A1 | 12/2011 | Nikolyn et al. ............... 702/136 |
| 2012/0024791 A1 | 2/2012 | Deetz et al. |
| 2012/0055860 A1 | 3/2012 | Wyndham .................. 210/198.3 |
| 2012/0065393 A1 | 3/2012 | Choi et al. .................... 540/456 |
| 2012/0071643 A1 | 3/2012 | Helfer et al. ................. 536/25.4 |
| 2012/0108803 A1 | 5/2012 | Han et al. .................... 536/24.5 |
| 2012/0205315 A1 | 8/2012 | Liu et al. ...................... 210/656 |
| 2012/0259094 A1 | 10/2012 | Hearn et al. ................ 530/387.7 |
| 2012/0283337 A1 | 11/2012 | Brick et al. .................. 514/772.4 |
| 2013/0020523 A1 | 1/2013 | Han et al. |
| 2013/0041135 A1 | 2/2013 | Tamori et al. .............. 530/387.1 |
| 2013/0046056 A1 | 2/2013 | Spector et al. .............. 525/54.1 |
| 2013/0056415 A1 | 3/2013 | Kozlov et al. ................ 210/636 |
| 2013/0109072 A1 | 5/2013 | Tsunoda et al. |
| 2013/0112623 A1 | 5/2013 | Fernandez-Lahore et al. |
| 2013/0122215 A1 | 5/2013 | Waller et al. |
| 2013/0131321 A1 | 5/2013 | Bitterman et al. |
| 2013/0133516 A1 | 5/2013 | Okano et al. ..................... 95/88 |
| 2013/0146542 A1 | 6/2013 | Huang et al. ................. 210/656 |
| 2013/0178608 A1 | 7/2013 | Kulkarni et al. |
| 2013/0189322 A1 | 7/2013 | Honeyman et al. |
| 2013/0193052 A1 | 8/2013 | Witt et al. |
| 2013/0245139 A1 | 9/2013 | Kozlov et al. |
| 2013/0274451 A1 | 10/2013 | Bjorkman et al. |
| 2013/0313187 A1 | 11/2013 | Yin et al. ................... 210/500.33 |
| 2014/0046023 A1 | 2/2014 | Gottschall et al. .... B01J 20/286 |
| 2014/0046029 A1 | 2/2014 | Shannon et al. ...... C08F 271/02 |

FOREIGN PATENT DOCUMENTS

| | | | |
|---|---|---|---|
| CN | 1157245 C | 7/2004 | ............ B01D 15/08 |
| CN | 101288843 A | 10/2008 | ............ B01J 20/283 |
| CN | 101381437 | 5/2011 | |
| CN | 102350325 | 2/2012 | ............ B01J 20/283 |
| CN | 102443120 | 3/2013 | |
| CN | 102675564 | 4/2014 | |
| DE | 762723 | 7/1952 | ............ C01B 13/14 |
| DE | 4102635 | 4/1995 | ............ C03C 11/00 |
| DE | 4422040 | 12/1995 | ............ C12N 15/10 |
| DE | 102006012467 | 9/2007 | |
| EP | 0333757 | 5/1983 | ............ C03C 11/00 |
| EP | 0039996 | 11/1983 | ............ B01J 21/00 |
| EP | 0188811 | 7/1986 | ............ C03C 13/00 |
| EP | 0106769 | 1/1987 | |
| EP | 0263934 | 8/1987 | |
| EP | 0363697 | 4/1990 | ............ C03C 11/00 |
| EP | 0298062 | 9/1991 | ............ C01B 33/16 |
| EP | 0221780 | 10/1991 | ............ G01N 30/48 |
| EP | 0403700 | 8/1992 | ............ B01J 20/32 |
| EP | 0172579 | 11/1992 | ............ B01J 20/32 |
| EP | 0545677 | 6/1993 | |
| EP | 0300273 | 3/1994 | |
| EP | 0520109 | 3/1995 | |
| EP | 0463036 | 9/1995 | |
| EP | 0710219 | 12/1997 | ............ C03C 20/00 |
| EP | 0490300 | 3/1998 | |
| EP | 0950067 | 10/1999 | |
| EP | 0693314 | 9/2001 | ............ B01J 20/32 |
| EP | 1229094 | 8/2002 | |
| EP | 0848752 | 6/2003 | ............ C12N 7/02 |
| EP | 1422521 A1 | 5/2004 | |
| EP | 1526115 | 4/2005 | ............ C01B 33/12 |

(56) References Cited

FOREIGN PATENT DOCUMENTS

| | | | |
|---|---|---|---|
| EP | 1717202 | 11/2006 | ............ C01B 33/18 |
| EP | 1864999 | 12/2007 | |
| EP | 1897890 | 3/2008 | |
| EP | 1900751 | 3/2008 | |
| EP | 1053021 | 1/2009 | ............ A61K 47/48 |
| EP | 2412433 | 2/2012 | ............ B01J 20/26 |
| EP | 2412434 | 2/2012 | ............ B01J 20/26 |
| EP | 2412435 | 2/2012 | ............ B01J 20/32 |
| EP | 2217646 | 1/2013 | |
| EP | 2352771 | 1/2013 | |
| EP | 2616169 | 7/2013 | |
| EP | 1758671 | 9/2013 | |
| EP | 1690867 B1 | 10/2013 | |
| GB | 1362331 | 8/1974 | ............ C01B 33/18 |
| GB | 1371440 | 10/1974 | ............ C01B 33/18 |
| GB | 1540956 | 4/1977 | ............ C07G 7/00 |
| JP | 54072787 | 6/1979 | ............ B01J 20/281 |
| JP | 57098520 | 6/1982 | ............ B01J 20/26 |
| JP | 59050052 | 3/1984 | |
| JP | 59050054 | 3/1984 | |
| JP | 62081400 | 4/1987 | ............ C07H 21/04 |
| JP | 1033012 | 2/1989 | ............ C01B 33/16 |
| JP | 4193708 | 7/1992 | ........... C01B 33/152 |
| JP | 5333015 | 12/1993 | ............ B01D 15/08 |
| JP | 06016738 | 1/1994 | |
| JP | 6281638 | 10/1994 | ......... B01J 20/281 |
| JP | 8029404 | 2/1996 | ............ G01N 30/44 |
| JP | 8134138 | 5/1996 | |
| JP | 2001139981 | 5/2001 | ............... C11B 3/00 |
| JP | 2003172733 | 6/2003 | ............ G01N 30/48 |
| JP | 2003194792 | 7/2003 | ............ G01N 30/48 |
| JP | 2003221219 | 8/2003 | ............ C01B 33/12 |
| JP | 2003221220 | 8/2003 | ............ C01B 33/12 |
| JP | 2003231755 | 8/2003 | ............ C08G 77/06 |
| JP | 2003267720 | 9/2003 | ............ C01B 33/12 |
| JP | 2005022894 | 1/2005 | ........... C01B 33/152 |
| JP | 2005022895 | 1/2005 | ............ C01B 33/12 |
| JP | 2005022896 | 1/2005 | ............ C01B 33/12 |
| JP | 2005022897 | 1/2005 | ............ C01B 33/12 |
| JP | 2005022898 | 1/2005 | ........... C01B 33/152 |
| JP | 2005162504 | 6/2005 | ............ C01B 33/18 |
| JP | 2007076941 | 3/2007 | ............ C01B 33/18 |
| JP | 2007238426 | 9/2007 | ........... C01B 33/157 |
| JP | 2011001336 | 1/2011 | |
| JP | 2012012334 | 1/2012 | |
| JP | 2013510918 | 3/2013 | |
| KR | 159716 | 12/1998 | ............ A61K 39/29 |
| RU | 2036236 | 5/1995 | ............... C12N 9/16 |
| RU | 2080905 | 6/1997 | ............ B01J 20/283 |
| SU | 1673512 | 8/1991 | ............ C01B 33/146 |
| WO | 8303776 A1 | 11/1983 | |
| WO | 8400773 | 3/1984 | ............ C12N 15/00 |
| WO | 9009237 | 8/1990 | ............ B01J 20/32 |
| WO | 9104095 | 4/1991 | ............ B01J 20/02 |
| WO | 9119780 | 12/1991 | ............... C12H 1/04 |
| WO | 9215396 | 9/1992 | ............ B01J 20/12 |
| WO | 9326019 | 12/1993 | ............... H01F 1/06 |
| WO | 9400237 | 1/1994 | |
| WO | 9403268 | 2/1994 | |
| WO | 9518137 | 7/1995 | ............ C07H 1/06 |
| WO | 9525789 | 9/1995 | |
| WO | 9705174 | 2/1997 | |
| WO | 9715661 | 5/1997 | ............ C12N 11/18 |
| WO | 9826048 | 6/1998 | ............ C12N 7/02 |
| WO | 9831461 | 7/1998 | |
| WO | 9960170 | 11/1999 | ............ C12Q 1/68 |
| WO | 2000034299 | 8/2000 | ............ C07H 21/00 |
| WO | 0102452 | 1/2001 | |
| WO | 0151476 | 7/2001 | .......... C07D 305/14 |
| WO | 0188520 | 11/2001 | |
| WO | 0228912 | 4/2002 | |
| WO | 02074791 | 9/2002 | ............ C07K 1/20 |
| WO | 03022392 | 3/2003 | ............ B01D 15/08 |
| WO | 03031580 | 4/2003 | |
| WO | 03049671 | 6/2003 | |
| WO | 03079002 | 9/2003 | ............ G01N 30/48 |
| WO | 2004009677 | 1/2004 | |
| WO | 2004018360 | 3/2004 | ............ C01B 33/16 |
| WO | 2004024318 | 3/2004 | |
| WO | 2004076511 | 9/2004 | |
| WO | 2006033634 | 3/2006 | ............ B01J 20/30 |
| WO | 2006110314 | 10/2006 | |
| WO | 2006136950 | 12/2006 | ............ B01J 20/22 |
| WO | 2007120248 | 10/2007 | ............ G01N 33/68 |
| WO | 2008027262 | 3/2008 | |
| WO | 2008140652 | 11/2008 | |
| WO | 2008147717 | 12/2008 | |
| WO | 2009053317 | 4/2009 | |
| WO | 2009079325 | 6/2009 | |
| WO | 2009102207 | 8/2009 | |
| WO | 2009150402 | 12/2009 | |
| WO | 2010027955 | 3/2010 | |
| WO | 2010090596 | 8/2010 | ............ C01B 33/18 |
| WO | 2010115923 | 10/2010 | ............ B01D 15/22 |
| WO | 2011012302 | 2/2011 | |
| WO | 2011017418 | 2/2011 | ............... C08J 9/00 |
| WO | 2011025867 | 3/2011 | |
| WO | 2011048083 | 4/2011 | ............... C12P 7/64 |
| WO | 2011072873 | 6/2011 | ............... C07K 1/22 |
| WO | 2011144346 | 11/2011 | .......... C01B 33/193 |
| WO | 2012015908 | 2/2012 | ............ B01D 15/36 |
| WO | 2012045152 | 4/2012 | ............ B01D 71/76 |
| WO | 2012087231 | 6/2012 | |
| WO | 2012110995 | 8/2012 | ............ B01J 20/10 |
| WO | 2013004587 | 1/2013 | |
| WO | 2013007793 | 1/2013 | |
| WO | 2013062105 | 5/2013 | |
| WO | 2013089477 | 6/2013 | |
| WO | 2014058570 A1 | 4/2014 | |

OTHER PUBLICATIONS

Iler; "The Chemistry of Silica;" (1979), pp. 462-621.

Clairbois et al; "Heparin Grafted Silica Beads for High Performance Affinity Chromatography of Proteins from Smooth Muscle Cell Membranes;" International Journal of Biochromatography, vol. 4(1), 1998, pp. 1-13.

Muller; "New Ion Exchangers for the Chromatography of Biopolymers;" Journal of Chromatography, 510 (1990), pp. 133-140.

Gong et al; "Preparation of Weak Anion Exchange Chromatographic Packings Based on Monodisperse Polymer Beads and their Application in the Separation of Bioploymers:" Journal of Chromatography & Related Technologies, 29 (2006), pp. 235-245.

Gu et al: "Silica-Based Strong Anion Exchange Media for Protein Purification;" Journal of Chromatography A, 1376 (2015), pp. 53-63.

International Search Report for PCT/US13/59984 (2014).

Bach, Long Giang; Islam, Md. Rafiqul; Jeong, Yean Tae; Hwang, Ha Sao; Lim, Kwon Taek, "A Facile Synthesis of PMMA-SiO2 Nanocomposites via Surface Initiated Radical Polymerization", Molecular Crystals and Liquid Crystals, 565(1), 78-87 (2012).

Banerjee, Jaya; Kumar, Rajesh; Srivastava, Abhishek; Behari, Kunj, "Graft Copolymerization of 2-Acrylamido-2-Methyl-1-Propanesulfonic Acid onto Carboxymethylcellulose (Sodium Salt) Using Bromate/Thiourea Redox Pair", Journal of Applied Polymer Science, 100(1), 26-34 (2006).

Binghe Gu, Yun Li and Lee, Milton L., "Polymer Monoliths with Low Hydrophobicity for Strong Cation-Exchange Capillary Liquid Chromatography of Peptides and Proteins", Analytical Chemistry, v 79, n 15, p. 5848-5855 (2007).

Bowes, Brian D., "Protein Transport and Adsorption in Polymer-Modified Ion-Exchange Media", University of Delaware, ProQuest Dissertations Publishing (2011).

Boyle, M.D.P.; Reis, K.J. "Bacterial Fc Receptors", Nature Biotechnology 5, p. 697-703 (1987).

Breadmore, Michael C.; Shrinivasan, Sushil; Karlinsey, James; Ferrance, Jerome P.; Norris, Pamela M.; Landers, James P. "Towards a Microchip-Based Chromatographic Platform. Part 2: Sol-Gel Phases Modified with Polyelectrolyte Multilayers for Capillary Electrochromatography", Electrophoresis, v 24, p. 1261-1270 (2003).

(56) References Cited

OTHER PUBLICATIONS

Brunauer, Stephen, Emmett, P.H., Teller, Edward "Adsorption of Gases in Multimolecular Layers" Journal of American Chemical Soceity, 60, p. 309-319 (1938).
Bruno, G.; Gasparrini, F.; Misiti, D.; Arrigoni-Martelll. E.; Bronzetti, M. "High-performance liquid chromatographic separation of biomolecules using calcium phosphate supported on macroporous silica microparticles", Journal of Chromatography, v 504, n 2, p. 319-333, 19g0; ISSN: 00219673, Publisher: Elsevier.
Buess-Herman, Claudine et al. "Hydration of a Polysulfone Anion-Exchange Membrane Studied by Vibrational Spectroscopy," Langmuir, vol. 19, No. 8 (2003).
Capito, Florian; Bauer, Johann: Rapp, Almut; Schroter, Christian; Kalmar, Harald; Stanislawski, Bernd, "Feasibility Study of Semi-Selective Protein Precipitation with Salt-Tolerant Copolymers for Industrial Purification of Therapeutic Antibodies", Biotechnology and Bioengineering, v 110, n 11, p. 2915-2927 (2013).
Carrot, Geraldine; Perez, Henri, "Controlled Surface Initiated Polymerizations from Inorganic Nanoparticles", Polymer Preprints (American Chemical Society, Division of Polymer Chemistry), 47(2), 827-828 (2006).
Chen, Xin; Tolley, H. Dennis; Lee, Milton L., "Polymeric Cation-Exchange Monolithic Columns Containing Phosphoric Acid Functional Groups for Capillary Liquid Chromatography of Peptides and Proteins", Journal of Chromatography A, v 1217, n 24, p. 3844-3854 (2010).
Dhar, P.; Vatansever. F.; Seery, "Modification of Silica Surfaces Using Surface Initiated Polymerization", Book of Abstracts, 215th ACS National Meeting, Dallas, Mar. 29-Apr. 2, PMSE-147 (1998).
Dyer, Daniel J.; Zhao, Tongfeng; Green, John-Bruce, "Surface Initiated Photopolymerization from Gold", Polymer Preprints (American Chemical Society, Division of Polymer Chemistry), 42(2) (2001).
Emara, Samy; Masujima, Tsutomu; Hadad, Ghada: Kamal, Maha; Zaazaa, Hala; Kawi, Mohamed Abdel, "A Rapid, Sensitive, and Environmentally Friendly On-Line Solid Phase Extraction Using Protein-Coated IJ-Bondapak Cyanide Silica Precolumn for Chromatographic Determination of Paracetamol in Human Serum.", Journal of Liquid Chromatography and Related Technologies, v 36, n 10, p. 1297-1311, Apr. 1, 2013; ISSN: 10826076, E-ISSN: 1520572X; DOI: 10, 1080/10826076.2012,686139; Publisher: Taylor and Francis Inc.
Guo, Hui, "Development of Chromatofocusing Techniques Employing Mixed-Mode Column Packings for Biomolecule Separations", Dissertations & Theses, University of Maryland, Baltimore County, ProQuest, UMI Dissertations Publishing (2014).
Hatch, R.G., "Chromatography of Proteins On a Silica-Based Support with Polyethylene No Glycol ligands", Journal of Chromatographic Science, v 28, n 4, p. 210-214, Apr. 1990; ISSN: 00219665.
Hernstrom, Petrus et al. "Atom-Transfer Radical Graft Polymerization Initiated Directly from Silica Applied to Functionalization of Stationary Phases for High-Performance Liquid Chromatography in the Hydrophilic Interaction Chromatography Mode," Analytical Chemistry, 78 (2006), pp. 7098-7103.
Huang, Meiyu; Wu, Ru, "Polymerization of Acrylic Acid Initiated by Poly(y-mercaptopropylsiloxane-lanthanide) Complexes", Ziran Zazhi, 5(12), 950-1 (1982).
Jandera, Pavel, "Stationary phases for hydrophilic interaction chromatography, their characterization and implementation into multidimensional chromatography concepts." Journal of Separation Science, v 31, n 9, pp. 1421-1437, May 2008, Hydrophilic interaction chromatography; ISSN: 16159306, E-ISSN: 16159314; DOI: 10.1002/jssc.200800051, Publisher: Wiley-VCH Verlag.
Katoh, Shigeo et al. "Affinity Purification of Antibodies: Optimization Strategies of Protein A—Coupled Silica Media", G.I.T. Laboratory Journal May 6, 2007 p. 26-27.
Katoh, Shigeo, "Affinity chromatography for large-scale purification of antibody pharmaceuticals", Biotechnology-based drug manufacturing technology series. Pharm Tech Japan, v 27, No. 11, 2011.
Katoh, Shigeo; Imada, Masami; Takeda, Naoki; Katsuda, Tomohlsa; Miyahara, Hiroyoshi; Inoue, Masaki; Nakamura, Shuji, "Optimization of silica-based media for antibody purification by protein A affinity chromatography", Journal of Chromatography A, v 1161, n 1-2, p. 36-40, Aug. 17, 2007, 26th International Symposium on the Separation of Proteins, Peptides and Polynucleotfdes; ISSN: 00219673; DOI: 10.1016/j.chroma.2007,04.023; Publisher: Elsevier.
Kuroda, Hirofumi; Nakatsuchi, Sayaka; Kitao, Nobuyoshi; Nakagawa, Tsuyoshi; "Radical polymerization of Methacrylates Having Moiety Activated by Electron-Withdrawing Group as a Reactive Functional Group" Relative & Functional Polymers, v 66, p. 229-238 (2006).
Liu, Shu-juan; Dun, Hui-juan; Zhou, Feng; Zhao, Liang; Liu, Xia; Jiang, Sheng-xiang, "Preparation of Polymer Modified Stationary Phases through Surface Radical Chain Transfer Reaction" Sepu, 20(5), 432-435 (2002).
Liu, Shu-juan; Zhou, Feng; Jiang, Sheng-xiang; Liu, Wei-min, "Characterization of Polymer Brushes on Nanoparticle Surfaces" Gaofenzi Cailiao Kexue Yu Gongcheng, 19(6), 65-68 (2003).
Liu, Shu-juan; Zhou, Feng; Jiang, Sheng-xiang; Liu, Wei-min, "Preparation of Stationary Phase for HPLC Through Surface-Initiated Polymerization" Gaofenzi Cailiao Kexue Yu Gongcheng, 19(6), 65-68 (2003).
Ma, Z et al. "Synthesis of Magnetic Chelator for High-Capacity Immobilized Metal Affinity Adsorption of Protein by Cerium Initiated Graft Polymerization." Langmuir, vol. 21, No. 15 (2005).
Maiti, Sukumar; Palit, Santi "Thiols as Redox Initiator for Vinyl Polymerization" Journal of Polymer Science: Polymer Chemistry, v 9, n 1, p. 253-256 (1971).
Manda, Keerthini "Synthesis and characterization of protein bonded stationary phases for HPAC.", Source: Dissertations & Theses, 2007. vol. 46, Issue 1, Publication I order No. AAI144524 7; http://search.proquest.com/docviewf33934537?accountid=142944.
Massom, L R; Ulbright, C; Snodgrass, P; Jarrett, H W, "Protein A-silica: Purification of Antibodies and Antigen/Antibody Complexes by High Pressure Affinity Chromatography", Biochromatography 4.3 (1989): 144-148; http://search. proquest.com/docview/15419101?accountid=142944.
McCue, Justin T.; Kemp, Glen; Low, Duncan; Quiniones-Garcia, Igor, "Evaluation of protein—A chromatography media", Science Direct_Journal of Chromatography A, 989 (2003) 139-153.
Mihai, M.; Schwarz, S.; Janke, A; Ghiorghia, C.A.; Dragan, E.S., "Silica Microparticles Surface Coating by Layer-by-Layer or Polyelectrolyte Complex Adsorption", Periodical: Journal of Polymer Research, v 20, n 2, 89 (2013).
Min, Jun Ho; Min, Seong Kee, "The Characteristics of Poly(acrylamide)-SiOx Nanoparticles Prepared by Graft-Polymerization", Periodical: Kongop Hwahak, 21(1), 34-39 (2010).
Miyahara, H; Nakashima, R; Inoue, M; Katsuda, T; Yamaji, H. Katoh, S; "Optimization and Performance of Silica-Based Media for Industrial-Scale Antibody Purification" Chemical Engineering & Technology (2012), 35, No. 1, 157-160. Publisher. Wiley-VCH Verlag.
Moon, Jung-Min et al. "Modification of Monodisperse Colloidal Silica by Radical Copolymerization of Cationic Surface Active Vinyl Monomers," Polymer Journal, vol. 41, No. 3 (2009), pp. 208-213.
Mori, Hideharu et al. "Controlled Radical Polymerization of an Acrylamide Containing I-Phenylalanine Moiety via RAFT." Macromolecules, No. 38, p. 9055-9065 (2005).
Murofushi, Katsumi, "Additive for Increase in Hardness and Adhesiveness of Photocurable Resin", Periodical: Purasuchikkusu, 57(9), 37-40 (2006).
Narayanan, S.; CraneS., "Affinity Chromatography Supports: A Look at Performance Requirements", Trends in Biotechnology, vol. 8, 1990, pp. 12-16; DOI: 10.1016/0167-7799(90)90124-G; Publisher: Elsevier.
Ohlson S, Wieslander J, "High-Performance Liquid Affinity Chromatographic Separation of Mouse Monoclonal Antibodies with Protein A Silica.", J Chromatogr. Jun. 26, 1987;397:207-12; Publisher: Elsevier.

(56) References Cited

OTHER PUBLICATIONS

Okaya, Takuji; Kikuchi, Kanji; Morii, Yukiko "Polymerization of Acrylamide in Aqueous Medium Initiated with a Redox System Composed of Cysteine and Potassium Bromate" Macromolecular Chemistry and Physics, v 198, p. 2027-2034 (1997).

Park, Mi•kyoung; Sakellariou, George; Pispas, Stergios; Hadjichristides, Nikos; Mays, Jimmy; Advincula, Rigoberto, "Living Anionic Surface Initiated Polymerization (LASIP): Synthesis and Characterization of Block Copolymers", Periodical: Abstracts of Papers, 223rd ACS National Meeting, Orlando, FL, United States, Apr. 7-11 (2002).

Prucker, Oswald; Habicht, Jorg; Park, In-Jun; Ruhe, Jurgen, "Photochemical Strategies for the Preparation, Micropatterning and Modification of Polymer Brushes", Periodical: Polymer Preprints (American Chemical Society, Division of Polymer Chemistry), 44(1), 470-471 (2003).

Rashid, Harun-Or; Lee, Won-Ki; Hong, Seong-Soo; Park, Jong Myung; Kim, Hyun Gyu; Um, Kwon Taek "Polymer Brushes on Carbon Nanotubes by Thioi-Lactam Initiated Radical Polymerization of 2-Hydroxyethyl Methacrylate", Journal of Nanoscience and Nanotechnology, v 12, p. 840-846 (2012).

Roy, Asit; Roy, Sujata, "Preparation of a high flow packing material (silica based) for high performance affinity chromatography of proteins." Affinity Chromatography and Biological Recognition, 1983, AMF Speciality Materials Group Meriden, Connecticut, USA, ISBN 0-12-166580-1. Publisher: Academic Press, Inc.

Salarizadeh, Parisa; Javanbakht. Mehran; Abdollahi, Mahdi; Naji, Leila, "Preparation, Characterization and Properties of Proton Exchange Nanocomposite Membranes Based On Poly(Vinyl Alcohol) and Poly(Sulfonic Acid)-Grafted Silica Nanoparticles" International Journal of Hydrogen Energy, v 38, n 13 (2013).

Savina, Irina et al. "Anion-Exchange Supermacroporous Monolithic Matrices with Grafted Polymer Brushes of N,N-Dirnethylaminoethyi-Methacrylate," Journal of Chromatography A, vol. 1092, No. 2 (2005).

Savina, Irina et al. "ion-Exchange Macroporous Hydrophilic Gel Monolith with Grafted Polymer Brushes." J. Mol. Recognit., vol. 19, No. 4 (2006).

Schmidt, D.E.; Giese, R.W.; Conran, D.; Karger, B.L, "High performance liquid chromatography of proteins on a dial-bonded silica gel stationary phase", Analytical Chemistry, v 52, n 1, 177-82, Jan. 1980; ISSN: 0003-2700; Country of publication: USA. Publisher. American Chemical Society.

Shimomura, Masato; Kikuchi, Hiroaki; Matsumoto, Hiroshi; Yamauchi, Takeshi; Miyauchi, Shinnosuke "Attaching of Poly(acrylic acid) to Inorganic Surface and its Application to Enzyme Immobilization" Polymer Journal, v 27, n 9, p. 974-977 (1995).

Shukla, J.S.; Singh, Khajan "Aqueous Polymerization of Acrylamide", Journal of Polymer Science: Polymer Chemistry Edition, vol. 17, 531 -538 (1979).

Srivastava, Arti; Behari, Kunj, "Graft Copolymerization of 2-Acrylamido-2-Methyi-1-Propane Sulphonic Acid onto Xanthan Gum by Ascorbic / Bromate Redox Pair" PMSE Preprints, 90, 698-699 (2004).

Tessrkmen, Deniz et al. "Synthesis of Tentacle-Type Magnetic Beads as Immobilized Metal-Chelate Affinity Support for Cytochrome C Adsorption," Int. J. Bioi. Macromol., vol. 38, No. 2 (2006).

Tsuneda, Setal. "Biding of Lysozyme onto a Cation-Exchange Microporous Membrane Containing Tentacle-Type Grafted Polymer Branches," Biotechnol Prog., vol. 10, No. 1 (1994).

Vuignier, Kanne; Fekete, Szabolcs; Carrupt, Pierre-Aiain; Veuthey, Jean-Luc; Guillarme, Davy, "Comparison of Various Silica-Based Monoliths for the Analysis of Large Biomolecules", Journal of Separation Science, v 36, n 14, p. 2231-2243, Jul. 2013; ISSN: 16159306, E-ISSN: 16159314; DOI: 10.1002/jssc.201300323; Publisher: Wiley.VCH Verlag.

Wang, Xiao-hua; Gao, Bao-jlao; Wang, Ming-juan; Fang, Xiao-lin, "Realizing Highly Effective Graft-Polymerization of Acrylonitrile on Surfaces of Silica Gel Particles by Constructing Mercapto Group-Cerium (IV) Salt Redox Initiation System" Gaofenzi Xuebao, (3), 256-263 (2012).

Wei, Bingchuan, "Silica colloidal crystals for ultra-efficient protein separations", Dissertations & Theses, Purdue University, ProQuest, UMI Dissertations Publishing, 2011. 3506193; ISBN 9781267315243; http://search.proquest.com/docview/1014174524?accountid= 142944, Publisher. UMI Dissertations Publishing 2011.

Xu, Liang et al. "Fabrication and Characterization of Open-Tubular CEC Modified with Tentacle-Type Metal Chelating Polymer Chains," Electrophoresis, vol. 28, No. 11 (2007).

Xu, Liang et al. "Novel Negatively Charged Tentacle-Type Polymer Coating for On-Line Preconcentration of Proteins in CE." Electrophoresis, vol. 30, No. 4 (2009).

Xu, Liang et al. "Novel Open Tubular CEC with Tentacle-Type Polymer Stationary Phase Functionalized by Phenylalanine." Electrophoresis, vol. 29, No. 4 (2008).

Yanase, Tomohiro et al. "Regeneration Technology of Tetramethylammonium Hydroxide Using ton Exchange Resin." Technology Reports of Kansai University, No. 47 (2005).

Yoshinaga, Kohji; Kondo, Akihiko; Higashitani, Ko; Kito, Taketoshi, "Immobilization of Protein On Monodispersed Colloidal Silica with Poly(Ethylene Glycol) Spacer and Application of the Composites to Immunological Agglutination Tests", Colloids and Surfaces A: Physicochemical and Engineering Aspects, v 77, n 2, p. 101-107, Sep. 17, 1993; ISSN: 09277757; DOI: 10.1 016/0927-7757(93)80106-0.

Zhang, Jian et al. "Capillary Electrochromatography of Peptides on a Column Packed with Tentacular Weak Cation-Exchanger Particles," Journal of Chromatography A, 953 (2002), pp. 239-249.

Zhang, Wenjun; Hu, Baoan; Zhang, Yan; Su, Hui; Xiao, Min, "Preparation of Novel Amphiphilic Polymeric Flocculant by Dispersion Polymerization Method", Huaxue Gongcheng, 37(2), 67-70 (2009).

U.S. Appl. No. 61/702,165, filed Sep. 17, 2012.

CHROMATOGRAPHY MEDIA AND DEVICES

FIELD OF THE INVENTION

The present invention is directed to chromatography media and chromatography devices containing chromatography media, methods of making chromatography devices, and methods of using chromatography devices.

BACKGROUND OF THE INVENTION

There is a need in the art to increase productivity and process efficiency in chromatographic operations.

SUMMARY OF THE INVENTION

The present invention addresses some of the difficulties and problems discussed above by the introduction of chromatography media and chromatography devices containing such chromatography media. The disclosed chromatography devices enable a more efficient, productive and/or environmentally friendly chromatographic operation due to one or more of the following advantages over conventional chromatographic operations: elimination of a device packing step by the user, elimination of clean-in-place (CIP) steps; elimination of clean-in-place (CIP) steps utilizing sodium hydroxide solution; elimination of any validation steps by the user; and use of a chromatography device comprising biodegradable material.

In one exemplary embodiment, the chromatography media of the present invention includes porous inorganic particles having a functionalized surface and having a median pore size of at least about 300 Angstroms (Å), or at least about 300 Å up to about 3000 Å. The porous inorganic particles may have a median pore size of at least about 400 Å (or at least about 500 Å; or at least about 600 Å; or at least about 700 Å; or at least about 800 Å; or greater than about 1000 Å). In another exemplary embodiment, the inorganic particles may have a BET surface area of at least about 20 $m^2/g$, or at least about 25 $m^2/g$, or about 30 $m^2/g$, up to about 2000 $m^2/g$. The inorganic particles may have a BET surface area of at least about 20 $m^2/g$, or at least about 25 $m^2/g$, at least about 30 $m^2/g$, or at least about 35 $m^2/g$. The inorganic particles may have a pore size distribution relative span of at least about 0.8, at least about 0.9, at least about 1.0, or at least about 1.1. The inorganic particles may have a pore size distribution relative span of at least about 0.8, at least about 0.9, at least about 1.0, or at least about 1.1, up to about 2.0. In another embodiment, the particles may have a functionalized surface comprising at least one molecule having a molecular weight of at least about 300 g/mol, or at least about 400 g/mol, or at least about 500 g/mol, up to about 500,000 g/mol. In another embodiment, the particles may comprise silica having a purity of at least about 93% by weight $SiO_2$, or at least about 93% by weight $SiO_2$, at least about 94% by weight $SiO_2$, at least about 95% by weight $SiO_2$, at least about 96% by weight $SiO_2$, at least about 97% by weight $SiO_2$, or at least about 98% by weight $SiO_2$ up to 100% by weight $SiO_2$ based upon the total weight of the particle.

The present invention is also directed to methods of making chromatography media or support. In one embodiment of the present invention, the media is designed to increase throughput by the use of incompressible inorganic resins for not just affinity chromatography but also for ion exchange, hydrophobic interaction, etc. In one exemplary method, the method of making a chromatography media comprises treating porous inorganic particles to form a functionalized surface thereon, wherein the porous inorganic particles have a median pore size of at least about 300 Angstroms (Å), or at least about 300 Å up to about 3000 Å. The porous inorganic particles may have a median pore size of at least about 400 Å (or at least about 500 Å; or at least about 600 Å; or at least about 700 Å; or at least about 800 Å; or greater than about 1000 Å), up to about 6000 Å. In another exemplary embodiment, the inorganic particles may have a BET surface area of at least about 20 $m^2/g$, or at least about 25 $m^2/g$, or about 30 $m^2/g$, up to about 2000 $m^2/g$. The inorganic particles may have a BET surface area of at least about 20 $m^2/g$, or at least about 25 $m^2/g$, at least about 30 $m^2/g$, or at least about 35 $m^2/g$, up to about 150 $m^2/g$. The inorganic particles may have a pore size distribution relative span of at least about 0.8, at least about 0.9, at least about 1.0, or at least about 1.1. The inorganic particles may have a pore size distribution relative span of at least about 0.8, at least about 0.9, at least about 1.0, or at least about 1.1, up to about 2.0. In another embodiment, the particles may have a functionalized surface comprising at least one molecule having a molecular weight of at least about 300 g/mol, or at least about 400 g/mol, or at least about 500 g/mol, up to about 500,000 g/mol. In another embodiment, the particles may comprise silica having a purity of at least about 93% by weight $SiO_2$, or at least about 93% by weight $SiO_2$, at least about 94% by weight $SiO_2$, at least about 95% by weight $SiO_2$, at least about 96% by weight $SiO_2$, at least about 97% by weight $SiO_2$, or at least about 98% by weight $SiO_2$ up to 100% by weight $SiO_2$ based upon the total weight of the particle.

In another exemplary embodiment, the chromatography devices of the present invention comprise a housing; and porous inorganic particles positioned within the housing, the porous inorganic particles having a functionalized surface and having a median pore size of at least about 300 Angstroms (Å), or at least about 300 Å up to about 6000 Å. The porous inorganic particles may have a median pore size of at least about 400 Å (or at least about 500 Å; or at least about 600 Å; or at least about 700 Å; or at least about 1000 Å, or at least about 2000 Å, or at least about 3000 Å, or at least about 4000 Å), up to about 6000 Å. In another exemplary embodiment, the inorganic particles may have a BET surface area of at least about 20 $m^2/g$, or at least about 25 $m^2/g$, or about 30 $m^2/g$, up to about 2000 $m^2/g$. The inorganic particles may have a BET surface area of at least about 20 $m^2/g$, or at least about 25 $m^2/g$, at least about 30 $m^2/g$, or at least about 35 $m^2/g$, up to about 150 $m^2/g$. The inorganic particles may have a pore size distribution relative span of at least about 0.8, at least about 0.9, at least about 1.0, or at least about 1.1. The inorganic particles may have a pore size distribution relative span of at least about 0.8, at least about 0.9, at least about 1.0, or at least about 1.1, up to about 2.0. In another embodiment, the particles may have a functionalized surface comprising at least one molecule having a molecular weight of at least about 300 g/mol, or at least about 400 g/mol, or at least about 500 g/mol, up to about 500,000 g/mol. In another embodiment, the particles may comprise silica having a purity of at least about 93% by weight $SiO_2$, or at least about 93% by weight $SiO_2$, at least about 94% by weight $SiO_2$, at least about 95% by weight $SiO_2$, at least about 96% by weight $SiO_2$, at least about 97% by weight $SiO_2$, or at least about 98% by weight $SiO_2$ up to 100% by weight $SiO_2$ based upon the total weight of the particle. The column housing may be formed from a polymeric material, a metal material, a glass material, a ceramic material, or a composite thereof, and desirably, is formed from a biodegradable polymeric material.

The present invention is also directed to methods of making chromatography devices. In one exemplary method, the method of making a chromatography device comprises incorporating porous inorganic particles into a housing, wherein the porous inorganic particles have a functionalized surface and a median pore size of at least about 300 Angstroms (Å), or at least about 300 Å up to about 6000 Å. The porous inorganic particles may have a median pore size of at least about 400 Å (or at least about 500 Å; or at least about 600 Å; or at least about 700 Å; or at least about 800 Å; or greater than about 1000 Å, or at least about 2000 Å, or at least about 3000 Å, or at least about 4000 Å), up to about 6000 Å. In another exemplary embodiment, the inorganic particles may have a BET surface area of at least about 20 $m^2/g$, or at least about 25 $m^2/g$, or about 30 $m^2/g$, up to about 2000 $m^2/g$. The inorganic particles may have a BET surface area of at least about 20 $m^2/g$, or at least about 25 $m^2/g$, at least about 30 $m^2/g$, or at least about 35 $m^2/g$, up to about 150 $m^2/g$. The inorganic particles may have a pore size distribution relative span of at least about 0.8, at least about 0.9, at least about 1.0, or at least about 1.1. The inorganic particles may have a pore size distribution relative span of at least about 0.8, at least about 0.9, at least about 1.0, or at least about 1.1, up to about 2.0. In another embodiment, the particles may have a functionalized surface comprising at least one molecule having a molecular weight of at least about 300 g/mol, or at least about 400 g/mol, or at least about 500 g/mol, up to about 500,000 g/mol. In another embodiment, the particles may comprise silica having a purity of at least about 93% by weight $SiO_2$, or at least about 93% by weight $SiO_2$, at least about 94% by weight $SiO_2$, at least about 95% by weight $SiO_2$, at least about 96% by weight $SiO_2$, at least about 97% by weight $SiO_2$, or at least about 98% by weight $SiO_2$ up to 100% by weight $SiO_2$ based upon the total weight of the particle. In some methods of making a chromatography column, the method comprises incorporating porous inorganic particles into a column housing formed from a polymeric material, a metal material, a glass material, a ceramic material, or a composite thereof, desirably, a biodegradable polymeric material.

The present invention is further directed to methods of using chromatography devices. In one exemplary method of using chromatography devices, the method comprises positioning the chromatography device within an operating position of a chromatography system; and processing a fluid through the chromatography device. In some embodiments, the method comprises processing a fluid containing one or more biomolecules through the chromatography device when in an operating position of a chromatography system. For example, the fluid may comprise a protein, a peptide, an oligonucleotide, or any combination thereof.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein.

DETAILED DESCRIPTION OF THE INVENTION

Figure 1:
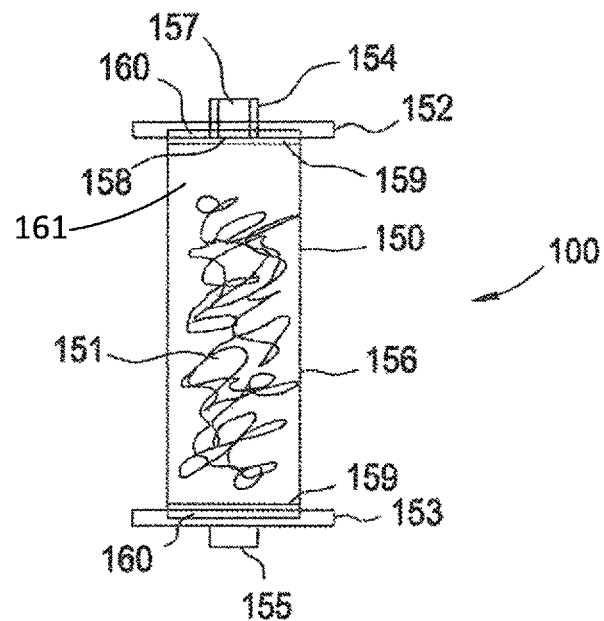
FIG. 1 depicts a view of an exemplary chromatography device of the present invention.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth.

"About" modifying, for example, the quantity of an ingredient in a composition, concentrations, volumes, process temperatures, process times, recoveries or yields, flow rates, and like values, and ranges thereof, employed in describing the embodiments of the disclosure, refers to variation in the numerical quantity that may occur, for example, through typical measuring and handling procedures; through inadvertent error in these procedures: through differences in the ingredients used to carry out the methods; and like proximate considerations. The term "about" also encompasses amounts that differ due to aging of a formulation with a particular initial concentration or mixture, and amounts that differ due to mixing or processing a formulation with a particular initial concentration or mixture. Whether modified by the term "about" the claims appended hereto include equivalents to these quantities.

As used herein, the term "biomolecule" means any molecule that is produced by a living organism, including large molecules such as proteins, polysaccharides, lipids, and nucleic acids; and small molecules such a primary metabolites, secondary metabolites, and natural products. Examples of biomolecules include cells and cell debris; antibodies, proteins and peptides; nucleic acids, such as DNA and RNA; endotoxins; viruses; vaccines and the like. Other examples of biomolecules include those recited in WO 2002/074791 and U.S. Pat. No. 5,451,660.

As used herein, "inorganic oxides" is defined as binary oxygen compounds where the inorganic component is the cation and the oxide is the anion. The inorganic material includes metals may also include metalloids. Metals include those elements on the left of the diagonal line drawn from boron to polonium on the periodic table. Metalloids or semi-metals include those elements that are on the right of this line. Examples of inorganic oxides include silica, alumina, titania, zirconia, etc., and mixtures thereof.

As used herein, "porous inorganic particles" includes particles comprised of inorganic materials, or combinations of inorganic materials (e.g., metals, semi-metals, and their alloys; ceramics, including inorganic oxides; etc.) and organic materials (e.g., organic polymers), such as composite materials, which are heterogeneous or homogeneous in nature. For example, heterogeneous composite materials include mere mixtures of materials, layered materials, core-shell, and the like. Examples of homogeneous composite materials include alloys, organic-inorganic polymer hybrid materials, and the like. The particles may be a variety of different symmetrical, asymmetrical or irregular shapes, including chain, rod or lath shape. The particles may have different structures including amorphous or crystalline, etc. The particles may include mixtures of particles comprising different compositions, sizes, shapes or physical structures, or that may be the same except for different surface treatments. Porosity of the particles may be intraparticle or interparticle in cases where smaller particles are agglomerated to form larger particles. In one exemplary embodiment the particles are composed of inorganic materials such as inorganic oxides, sulfides, hydroxides, carbonates, silicates, phosphates, etc, but are preferably inorganic oxides, which may be formed via any known process including, but not limited to, solution polymerization such as for forming colloidal particles, continuous flame hydrolysis such as for forming fused particles, gelation such as for forming gelled particles, precipitation, spraying, templating, sol-gel, and the like.

As used herein, the term "ordered porous material" refers to porous particles that have structural order with a very narrow pore size distribution such that the pore size distribution has a relative span, as defined herein, of less than 0.5.

As used herein, the term "non-ordered porous material" refers to porous particles possessing a pore size distribution that is not uniform (i.e., a very broad pore size distribution that is multimodal in nature) such that the pore size distribution has a relative span, as defined herein, of greater than 0.5.

As used herein, the term "functionalized surface" means inorganic particles that have been surface modified by reaction with functional compound to alter the wettability or selectivity of at least a portion of the particle surface, including the surface area on the external portion of the particles, and/or on the surface area of the internal pores. The functionalized surface may be used to form a bonded phase (covalently or ionically), a coated surface (e.g., reverse phase C18 bonded), a clad surface (e.g., carbon clad as in EP6), a polymerized surface (e.g., ion exchange), an inherent surface (e.g., inorganic/organic hybrid material), or the like. For example, reacting inorganic particles with octadecyltrichlorosilane forms a "reverse phase" by covalently bonding the silane to the inorganic surface (e.g., C4, C8, C18, etc.). In another example, reaction of the inorganic particles with aminopropyltrimethoxysilane followed by quaternization of the amino group forms an "anion exchange phase". In a third example, a bonded phase may be formed by reaction of the inorganic particles with aminopropyltrimethoxysilane followed by formation of an amide with an acid chloride. Other bonded phases include diol, cyano, cation, affinity, chiral, amino, C18, hydrophilic interaction (HILIC), hydrophobic interaction (HIC), mixed mode, size exclusion, etc. As part of the bonded phase or functionalized surface, a ligand may be used to show specific interaction with the target molecule or biomolecule (e.g., ligate), such as those set forth in U.S. Pat. No. 4,895,806.

As used herein, the term "molecular weight" is defined as meaning the molar mass of a single molecule of a particular compound or polymer.

As used herein, the term "chromatography" means the process of passing a mixture dissolved in a mobile phase through a stationary phase (i.e., chromatography media) housed in a column or cartridge or other container, which separates a target molecule from other molecules in the mixture and allows it to be isolated. Depending upon the type of chromatography used, the target molecule may be adsorbed onto the stationary phase while the undesired components are passed through the device, or vice versa. The term "liquid chromatography" is a form of chromatography where a liquid is used as the mobile phase and a solid or a liquid on a solid support as the stationary phase. The term "flash chromatography" means liquid chromatography that is conducted under a positive pressure (e.g., up to 300 psi). The term "high performance liquid chromatography" (HPLC) means liquid chromatography that is conducted under a high positive pressure (e.g., up to about 5000 psi). The term "preparatory chromatography" means HPLC for the isolation and purification of a target compound or molecule. The term "fast protein liquid chromatography" (FPLC) is a form of HPLC useful for the separation of biomolecules.

As used herein, the term "impurities" means materials present in the inorganic particles, other than the inorganic.

As used herein, the term "irregular" as it applies to the inorganic particles means that the particle shape from one particle to the next is not uniform (i.e., random particle shape) with an aspect ratio of greater than 1.0.

As used herein, the term "housing" means vessel or container for holding a stationary phase for use in chromatography, and includes cartridges, columns, tubes, devices, beds, bags, and the like.

As used herein, the term "stationary phase" or "chromatography media" or "chromatography support" means a material that includes a functionalized surface (e.g., ligands attached to the surface of the inorganic particles via some functional group) that shows different affinities for different components in a sample mixture, which is used in chromatography to separate a target molecule (e.g., ligates) from a mixture of one or more other molecules. Stationary phases include organic and inorganic materials, or hybrids thereof, and may be in the form of particles, monoliths, membranes, coatings, and the like.

As used herein, the term "pore size distribution" means the relative abundance of each pore size in a representative volume of porous inorganic particles. As used herein "median pore size" is the pore diameter of which 50% of the intraparticle pore volume resides. See FIG. 3.

Figure 3:
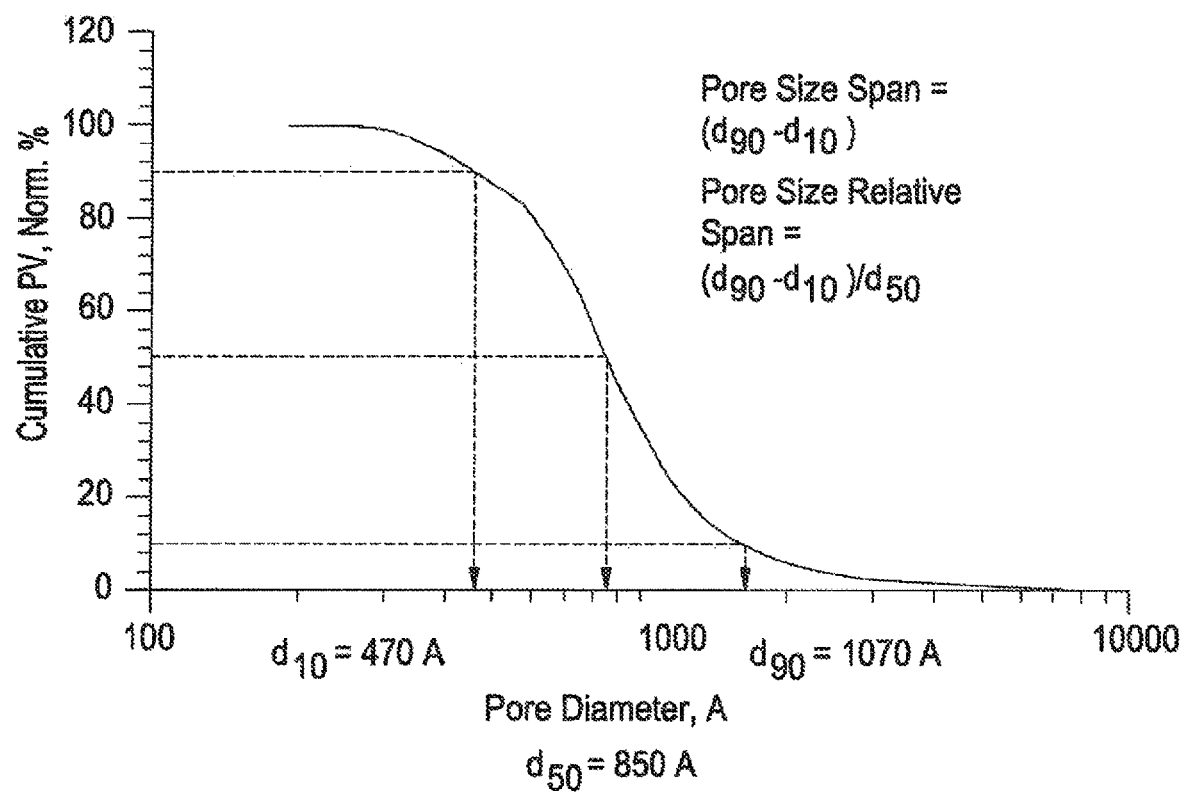
FIG. 3 depicts a graph of pore size distribution of an exemplary embodiment of the chromatography media of the present invention.

As used herein, the term "relative span" is defined as meaning a measure of the breadth of pore size distribution. The "span" is measured by subtracting the $d_{10}$ pore size (i.e., the pore size/diameter below which 10% of the pore volume resides) from the $d_{90}$ pore size (i.e., the pore size/diameter below which 90% by pore volume resides) as measured by mercury porosimetry. The term "relative span" is defined as the ratio of $(d_{90}-d_{10})/d_{50}$ and is depicted in FIG. 3.

The present invention is directed to chromatography columns. The present invention is further directed to methods of making chromatography columns, as well as methods of using chromatography columns. A description of exemplary chromatography columns, methods of making chromatography columns, and methods of using chromatography columns is provided below.

FIG. 1 provides a view of an exemplary chromatography column 100 of the present invention. As shown in FIG. 1, exemplary chromatography column 100 comprises a column housing 150; and chromatography media 151 positioned within column housing 150. Desirably, chromatography media 151 comprises porous inorganic particles 151 having a median pore size of at least 10 Angstroms (Å). As further shown in FIG. 1, column housing 150 typically comprises a tubular housing member 156, a first tubular housing member end cap 152, a second tubular housing member end cap 153 opposite end cap 152, a column inlet 154, and a column outlet 155. The column 100 may be packed with porous inorganic particles 151 in the form of a slurry through column inlet 154, the column inlet 154 comprising a central bore 157 having a passageway therein, and nozzle 158. A wide range of nozzles 158 may be used which facilitate the distribution and even packing of the slurry within the column 100. Filters 159 are each positioned on the interior face of the end caps 152, 153 and act with the tubular member 156 to define bed space 161 for the chromatography media 151 and also to prevent leakage of porous inorganic particles 151 from the bed space 161. A distribution channel 160 is located transversely across the face of the first end cap 152 and/or second end cap 153, and is in fluid communication with filter 159. The fluid distribution channel 160 acts to facilitate radial distribution of the liquid. In a simple form, the distribution channel 160 comprises at least one circumferential and/or radial groove in the face of the first and/or second end caps 152 and 163. The groove is positioned such that it effects the circumferential and/or radial distribution of liquid emanating from nozzle 158 of column inlet 154. It will be understood that a wide range of column capacities is possible, typically ranging from 0.1 to 2000 liters, and 0.1 to 100 liters when using the column as a disposable column. See also US 2008/0017579, the entire subject matter thereof incorporated herein by reference.

Column housing 150 may be formed from a variety of materials. Typically, column housing 150 comprises a polymeric material, a metal material, a glass material, a ceramic material, or a composite thereof, and desirably, comprises a polymeric material. Suitable polymeric materials for forming column housing 150 include, but are not limited to any synthetic or semi-synthetic organic solids, such as plastic, that are moldable, including polyolefins.

Column housing 150 may be formed using conventional thermoforming techniques. For example, tubular housing member 156, first tubular housing member end cap 152, and second tubular housing member end cap 153 of column housing 150 may each independently be formed via a molding step. In some embodiments, tubular housing member 156 and one of (i) first tubular housing member end cap 152 and (ii) second tubular housing member end cap 153 of column housing 150 are formed via a single molding step (i.e., one of the end caps is integrally formed on one end of tubular housing member 156).

As discussed above, media 151 positioned within column housing 150 may comprise porous inorganic particles having a median pore size of at least about 300 Å. In another embodiment, the porous inorganic particles have a median pore size of at least about 300 Å (or at least about 350 Å: or at least about 400 Å; or at least about 450 Å; or at least about 500 Å, or at least about 600 Å; or at least about 700 Å; or at least about 800 Å; or greater than about 1000 Å, or at least about 2000 Å, or at least about 3000 Å, or at least about 4000 Å) up to about 6000 Å. In some embodiments, the porous inorganic particles have a median pore size of from about 500 Å to about 6000 Å.

In other embodiments, the porous inorganic particles typically have a particle size, as measured by a median particle dimension, ranging from about 1 micron (μm) to about 150 μm. The porous inorganic particles typically have a median particle dimension of about 1 μm, more typically, less than about 120 μm. In some embodiments, the porous inorganic particles have a median particle dimension of from about 10 to about 120 μm, more desirably, from about 20 to about 90 μm.

In a further embodiment, the porous inorganic particles typically have an irregular shape, but may have any shape (e.g., spherical, elliptical, etc.). Regardless of shape, the porous inorganic particles typically have a median particle dimension as discussed herein.

In additional embodiments, the porous inorganic particles typically have an aspect ratio of at least about 1.0 as measured, for example, using Transmission Electron Microscopy (TEM) techniques. As used herein, the term "aspect ratio" is used to describe the ratio between (i) the median particle dimension of the porous inorganic particles and (ii) the median cross-sectional particle dimension of the porous inorganic particles, wherein the cross-sectional particle dimension is substantially perpendicular to the largest particle dimension of the porous inorganic particles. In some embodiments of the present invention, the porous inorganic particles have an aspect ratio of at least about 1.1 (or at least about 1.2, or at least about 1.3, or at least about 1.4) up to about 5.0. Typically, the porous inorganic particles have an aspect ratio of from about 1.0 to about 1.5.

In some embodiments, the porous inorganic particles typically have a pore volume as measured by nitrogen porosimetry of at least about 0.5 cc/g. In one exemplary embodiment of the present invention, the porous inorganic particles have a pore volume as measured by nitrogen porosimetry of from about 1.0 cc/g to about 3.0 cc/g. In another exemplary embodiment of the present invention, the porous inorganic particles have a pore volume as measured by nitrogen porosimetry of from about 1.0 cc/g to about 2.0 cc/g.

In another embodiment, the porous inorganic particles also have a surface area as measured by the BET nitrogen adsorption method (i.e., the Brunauer Emmet Teller method) of at least about 20 $m^2/g$, or at least about 25 $m^2/g$, or at least about 30 $m^2/g$. In one exemplary embodiment of the present invention, the porous inorganic oxide particles have a BET surface area of from about 20 $m^2/g$ to about 2000 $m^2/g$, or from 25 $m^2/g$ to about 2000 $m^2/g$ or from about 30 $m^2/g$ to about 1000 $m^2/g$. In a further exemplary embodiment of the present invention, the porous inorganic oxide particles have a BET surface area of from about 20 $m^2/g$ to about 1000 $m^2/g$, or from about 25 $m^2/g$ to about 1000 $m^2/g$, or from about 30 $m^2/g$ to about 1000 $m^2/g$.

In another embodiment, the particles may have a functionalized surface comprising at least one molecule having a molecular weight of at least about 300 g/mol, or at least about 400 g/mol, or at least about 500 g/mol, up to about 500,000 g/mol. In another embodiment, the particles may comprise silica having a purity of at least about 93% by weight $SiO_2$, or at least about 93% by weight $SiO_2$, at least about 94% by weight $SiO_2$, at least about 95% by weight SiO$_2$, at least about 96% by weight SiO$_2$, at least about 97% by weight SiO$_2$, or at least about 98% by weight SiO$_2$ up to 100% by weight SiO$_2$ based upon the total weight of the particle.

In further embodiments, the porous inorganic particles typically have a relative span with regard to pore size distribution of at least about 0.8, or at least about 0.9, or at least about 1.0, or at least about 1.1, or at least about 1.2, or at least about 1.3, or at least about 1.4, or at least about 1.5. In other embodiments, the porous inorganic particles typically have a relative span with regard to pore size distribution of at least about 0.8, or at least about 0.9, or at least about 1.0, or at least about 1.1, or at least about 1.2, or at least about 1.3, or at least about 1.4, or at least about 1.5, all up to about 2.0. See FIG. 3 where a pore size distribution of an exemplary particle is presented.

In some exemplary embodiments, the porous inorganic particles of the present invention are prepared from a variety of porous inorganic materials. In further embodiments, the porous inorganic particles include porous precipitated inorganic oxides, inorganic oxide gels and fumed oxides.

In embodiments comprising gels, the parent particles are derived from porous inorganic oxide gels such as, but not limited to, gels comprising SiO$_2$. The gels can be hydrogels, aerogels, or xerogels. A hydrogel is also known as an aquagel which is formed in water and as a result its pores are filled with water. A xerogel is a hydrogel with the water removed. An aerogel is a type of xerogel from which the liquid has been removed in such a way as to minimize any collapse or change in the gel's structure as the water is removed.

Gels are well known in the art. See Iler's "The Chemistry of Silica", p. 462 (1979). Gel, e.g. silica gel, particles are distinguishable from colloidal silica or precipitated silica particles. For example, colloidal silica is prepared as a slurry of dense, non-porous silica particles. Colloidal silica particles typically are smaller than 200 nm (0.2 micron). As mentioned earlier, these particles do not have internal porosity. On the other hand, typical dispersed precipitated particles have some internal porosity. In some cases, the internal porosity in typically precipitated particles, however, largely collapse under capillary pressure created by receding menisci of water as the water evaporates during drying. The conditions for making colloidal silica and precipitated silica are well known.

Gels, on the other hand, are prepared under conditions which promote coalescence of primary particles (typically having median particles sizes of about 1 to about 10 nm, as measured under transmission electron microscopy, i.e., TEM) to form a relatively rigid three dimensional network. The coalescence of gel is exhibited on a macroscale when a dispersion of inorganic oxide, e.g., silica, hardens to a "gel" or "gelled" mass having structural integrity.

Methods of preparing inorganic oxide gels are well known in the art. For example, a silica gel is prepared by mixing an aqueous solution of an alkali metal silicate (e.g., sodium silicate) with a strong acid such as nitric or sulfuric acid, the mixing being done under suitable conditions of agitation to form a clear silica sol which sets into a hydrogel, i.e., macrogel, in less than about one-half hour. The resulting gel is then washed. The concentration of inorganic oxide, i.e., SiO$_2$, formed in the hydrogel is usually in the range of about 10 and about 50, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 50° C.

The newly formed hydrogels are washed simply by immersion in a continuously moving stream of water, which leaches out the undesirable salts, leaving about 99.5 weight percent or more pure inorganic oxide behind.

The pH, temperature, and duration of the wash water will influence the physical properties of the silica, such as surface area (SA) and pore volume (PV). Silica gel washed at 65-90° C. at pH's of 8-9 for about 15 to about 36 hours will usually have SA's of about 250 to about 400 m$^2$/g and form aerogels with PV's of about 1.4 to about 1.7 cc/gm. Silica gel washed at pH's of 3-5 at about 50 to about 65° C. for about 15 to about 25 hours will have SA's of about 700 to about 850 m$^2$/g and form aerogels with PV's of about 0.6 to about 1.3 ml/g. These measurements are generated by the well known N$_2$ porosity method. Hydrogel is dried by blowing air at a temperatures ranging from 100 to 180° C. through the hydrogel bed until the moisture in the gel is less than about 20%, preferably less than about 10%, and more preferably less than about 5% by weight. Processes for making xerogels may be found in U.S. Pat. Nos. 6,565,905 and 5,622,743.

Reinforced precipitated silica such as that described in U.S. Pat. No. 4,157,920 can also be used to prepare the dispersion of this invention. The contents of that patent are incorporated herein by reference. For example, reinforced precipitated silicas can be prepared by first acidulating an alkali inorganic silicate to create an initial precipitate. The resulting precipitate is then reinforced or "post conditioned" by additional silicate and acid. The precipitate resulting from the second addition of silicate and acid comprises 10 to 70% by weight of the precipitate initially prepared. It is believed that the reinforced structure of this precipitate is more rigid than conventional precipitates as a result of the second precipitation. It is believed that even after milling, centrifuging and subsequent drying, the reinforced silicate substantially maintains its network rigidity and porosity. This is in contrast to other precipitated silicas such as those disclosed in U.S. Pat. No. 5,030,286.

In another embodiment, the inorganic oxide comprises fumed silica. Fumed silica may be fabricated using the processes described in DE 762723. Production of fumed silica is also discussed in Ullmann's Encyclopaedia of Industrial Chemistry, Vol. A23, 1993, Chapter 6.

Once the porous particles are formed, they are then milled. The general milling conditions can vary depending on the feed material, residence time, impeller speeds, and milling media particle size. These conditions can be varied to obtain the desired size within the range of about 1 to about 120 microns. The techniques for selecting and modifying these conditions to obtain the desired dispersions are known to those skilled in the art. The milling equipment used to mill the porous inorganic oxide particles should be of the type capable of severely milling and reducing materials to particles having sizes about 1 to about 120 microns, e.g., through mechanical action. Such mills are commercially available, with hammer and sand mills being particularly suitable for this purpose. Hammer mills impart the necessary mechanical action through high speed metal blades, and sand mills impart the action through rapidly churning media such as zirconia or sand beads. Impact mills can also be used. Both impact mills and hammer mills reduce particle size by impact of the inorganic oxide with metal blades. Other suitable mills for use in this invention include, but are not limited to, the Air Classifying Mill (ACM) or the Fluid Energy Mill (FEM). The milled inorganic oxide particles may be classified using an air classifier if not performed during the milling process.

In one embodiment of the present invention, the milled porous inorganic particles are then treated hydrothermally at about 100 to about 400° C. for about 2 to about 20 hours and at a pH of about 8 to about 10. Alternatively, the hydrothermal treatment may be conducted as set forth in U.S. Pat. Nos. 5,976,479; 4,732,887; and 4,104,363. The conditions of the hydrothermal treatment affect the pore volume, surface area, pore size and structural integrity of the particles.

The porous inorganic oxide particles may be surface modified so as to selectively enhance bonding of a desired material to the inorganic oxide particle surface. For example, the porous inorganic oxide particles may further comprise a surface chemistry in the form of one or more chemical moieties bonded thereto so as to selectively bond to one or more materials within a given fluid processed through the chromatography column, which is referred to herein as a functionalized surface. Chemical moieties such as bifunctional ligands, etc. may be bonded to the particle surface, for example, as described in U.S. Pat. No. 7,166,213 assigned to W. R. Grace & Co.-Conn., the subject matter of which is incorporated herein by reference in its entirety. In one embodiment, this stationary/bonded phase, or chromatography media, includes an active group or ligand as part of the functionalized surface of the particle, and is typically covalently bonded to the particle via some linkage. The ligand may be any chemical species that show specific interaction with another molecular component, in this case the target biomolecule. Known ligands include charged groups (such as sulfonic acid, quarternary ammonium, diethyl aminoethyl, carboxyl methyl); synthetic dyes; alkyl and aryl compounds (such as phenyl boronate, octyl); proteins; lectins; antibodies; antigens, enzymes and so on. Ligates, that is compounds which can be separated by chromatographic techniques, include a wide range of biomolecules such as proteins; enzymes; peptides; antibodies; antigens; lectins; DNA; RNA; antibiotics; etc.

In one embodiment of the present invention, the surface of the inorganic oxide particles is first treated with two sets of silanes carrying different functional groups. The first set of functional groups enable polymerization of one or more monomers onto the particle surface via the first set of functional groups (e.g., linkers), and the second set of functional groups increases the wettability of said surface. Subsequent polymerization introduces ionic charge groups that allow interactions and bindings of biomolecules.

Figure 2:
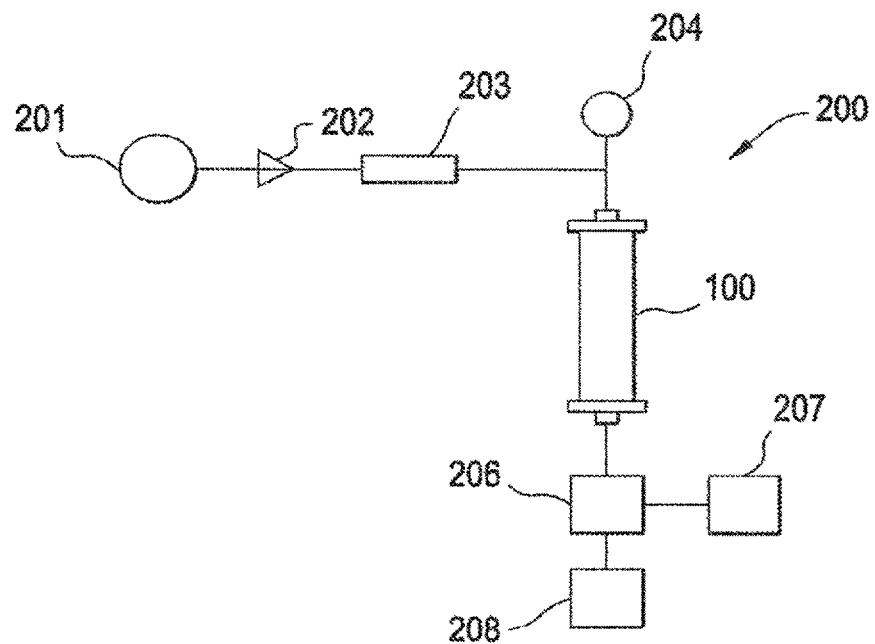
FIG. 2 depicts a view of an exemplary chromatography system comprising the chromatography column shown in FIG. 1.

The chromatography columns of the present invention, such as exemplary chromatography column 100, may be tailored for use in a given application. Regardless of application, the chromatography columns of the present invention, such as exemplary chromatography column 100, may be sized so as to be insertable into a variety of chromatography systems. FIG. 2 depicts a view of an exemplary chromatography system 200 comprising chromatography column shown in FIG. 1.

As shown in FIG. 2, exemplary chromatography system 200 comprises the following components: chromatography column 100, solvent reservoir 201, pump 202, pre-column 203, injection port 204, detector 206, recorder/monitor 207, and waste collector 208. Although not shown in FIG. 2, chromatography column 100 may be used in combination with other system components suitable for use in chromatography systems, such as exemplary chromatography system 200, wherein the other system components include, but are not limited to, multiple solvent reservoirs 201, a vacuum pump, a flow splitter, a pressure gauge, a degasser, a fraction collector, etc.

The present invention is also directed to methods of making chromatography columns. In one embodiment, the method of making a chromatography column comprises incorporating porous inorganic oxide particles into the column housing. The method of making a chromatography column may further comprise one or more additional steps. Suitable additional steps include, but are not limited to, forming the column housing via a thermoforming step (e.g., any molding step, e.g., injection molding); cleaning the porous inorganic oxide particles positioned within the column housing by exposing the porous inorganic oxide particles to a non-NaOH solution; validating the chromatography column via one or more validation tests; and packaging the cleaned, validated chromatography column in a shippable container.

In the disclosed methods, the step of forming the column housing via a thermoforming step may comprise thermoforming a tubular housing member, and at least one separate and attachable tubular housing member end cap. In some embodiments, the thermoforming step comprises thermoforming (i) a tubular housing member having a first open end and a closed opposite end (i.e., an integrally formed end cap having a column housing outlet therein), and (ii) a first tubular housing member end cap that is separate and attachable to the open end of the tubular housing member. In other embodiments, the thermoforming step comprises thermoforming (i) a tubular housing member having opposite open ends, (ii) a first tubular housing member end cap separate and attachable to a first open end of the tubular housing member, and (iii) a second tubular housing member end cap separate and attachable to a second open end of the tubular housing member, the second tubular housing member end cap being attachable to the tubular housing member end cap opposite the first tubular housing member end cap.

The present invention is further directed to methods of using chromatography columns. In one embodiment, the method of using a chromatography column of the present invention comprises positioning the chromatography column within an operating position of a chromatography system; and processing a fluid through the chromatography column. In some embodiments, the method of using a chromatography column comprises processing a fluid containing one or more biomolecules through the chromatography column. For example, the fluid may comprise a protein, a peptide, an oligonucleotide, or any combination thereof.

In one embodiment, the mobile phase or liquid containing one or more analytes (target molecule) or substances for separation on the column 100 is added via column inlet 154. Mobile phase exiting the outlet 158 into the bed space 161 will be distributed evenly across the distribution channel 160, pass through filter 159 and then be eluted uniformly through the bed of particulate medium 151. The mobile phase will finally exit the column through column outlet 155.

The disclosed methods of using a chromatography column of the present invention, such as exemplary chromatography column 100, advantageously do not comprise a clean-in-place step within the chromatography system (e.g., exemplary chromatography system 200 shown in FIG. 2). In other words, multiple runs may be performed on a given chromatography system, such as exemplary chromatography system 200 shown in FIG. 2, without the need to have a clean-in-place step. Instead, when a given chromatography column has been used and needs to be cleaned, the used chromatography column is replaced with a replacement chromatography column, and the chromatography system continues to operate without the delays associated with a clean-in-place step.

The disclosed methods of using the disclosed chromatography columns of the present invention may also comprise the step of providing the chromatography column to a user, wherein the providing step comprises providing a pre-packed and validated chromatography column to the user. This step eliminates the need for the user to perform one or more column preparation steps, and further enables an efficient use of the user's time and processing capacity.

Methods of using disposable columns may be suitable for separating one or more biomolecules from a sample. Although not limited to any particular application, the methods of using disposable columns of the present invention may be used to separate one or more biomolecules from a sample, wherein the one or more biomolecules are selected from at least one protein, peptide, oligonucleotide, polysaccharides, lipids, nucleic acids, metabolites, viruses, vaccines, or any combination thereof.

In exemplary embodiments, the porous particles of the present invention may be used in a variety of applications including all of the bonded phases mentioned herein, for example, such as ion exchange chromatography, hydrophobic interaction chromatography, affinity chromatography, size exclusion, and the like. Ion exchange chromatography is frequently used in protocols for the isolation of immunoglobulins. In anion exchange chromatography, negatively charged amino acid side chains of the immunoglobulin will interact with positively charged ligands of a chromatography matrix. In cation exchange chromatography on the other hand, positively charged amino acid side chains of the immunoglobulin will interact with negatively charged ligands of a chromatography matrix. Hydrophobic interaction chromatography (HIC) is another method described and used in protocols for the isolation of immunoglobulins. If a highly pure immunoglobulin product the object, it is commonly recommended to combine HIC with one or more further steps. In HIC, in order to make the immunoglobulin bind efficiently to the HIC matrix, addition of lyotropic salts to the mobile phase is required. The bound immunoglobulin is subsequently released from the matrix by lowering the concentration of lyotropic salt. Affinity chromatography is based on specific interactions between a target biomolecule and a biospecific ligand in a principle of lock-key recognition. Thus, the target and ligand will constitute an affinity pair, such as antigen/antibody, enzyme/receptor etc. Protein-based affinity ligands are well known, such as Protein A, Protein G and Protein L affinity chromatography which are both widespread methods for isolation and purification of antibodies. It is well known that Protein A chromatography provides an outstanding specificity, particularly towards monoclonal antibodies, and consequently high purities are obtainable. Used in combination with ion exchange, hydrophobic interaction, hydroxyapatite and/or gel filtration steps, Protein A-based methods have become the antibody purification method of choice for many biopharmaceutical companies, see e.g. WO 8400773 and U.S. Pat. No. 5,151,350.

In exemplary embodiments, the porous particles of the present invention may be used in a variety of applications, such as mixed mode or multi-modal separation matrices or media. The term "multi-modal" separation media refers to matrix capable of providing at least two different, but cooperative, sites which interact with the compound to be bound. For example, one of these sites may give an attractive type of charge-charge interaction between the ligand and the substance of interest. The other site may give electron acceptor-donor interaction and/or hydrophobic and/or hydrophilic interactions. See e.g., U.S. Pat. No. 7,714,112. In addition, the porous particles of the present invention may be used in expanded bed adsorption (see e.g., U.S. Pat. No. 6,620,326); as part of a membrane to improve purification performance (see e.g., U.S. 2011/0049042); used in applications with fluidized bed adsorption (see e.g., U.S. 2005/0269257), and in any other applications suitable for purification or adsorption using wide pore materials.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples describe processes in accordance with the present invention for preparing chromatography media having functionalized surfaces, including ion exchange and protein A, but other surface functionalization may be used. One embodiment of the present invention shown in the examples relates to the porous inorganic media based ion exchange material which was prepared by a process which consisted of two main steps: (1) bonding of large pore silica with two silanes: (3-glycidyloxypropyl) trimethoxysilane and 3-(trimethoxysilyl) propyl methacrylate to form an initially bonded intermediate; and (2) solution polymerization of ionic monomer(s), with an azo initiator, in the presence of the initially bonded silica intermediate for either strong anion exchange media (Q-silica) or strong cation exchange media (S-Silica).

Another embodiment of the invention shown in the examples was a process for the preparation of Q-silica wherein the monomers utilized were (3-acrylamidopropyl) trimethylammonium chloride, a small amount of diallyldimethylammonium chloride solution, and the initiator is 2,2'-azobis(2-methylpropionamidine)dihydrochloride (V-50 initiator).

Another embodiment of the invention shown in the examples is a process for the preparation of S-silica. The process included an extra step of washing the initially bonded intermediate with tetramethylammonium chloride solution is added to aid the polymerization. In this polymerization embodiment, the monomer is 2-acryamido-2-methyl-1-propanesulfonic acid (AMPS), and the initiator is 4,4'-azobis(cyanovaleric acid) (V-501 initiator). This polymerization uses a chain transfer agent (CTA), e.g., S,S'-Bis ($\alpha,\alpha$'-dimethyl-$\alpha$"-acetic acid)-trithiocarbonate, which is available from ABCR GmbH KG. The function of CTA is to control the chain length of the polymerization and help reduce any blockage of the pores (See FIG. 4). This process is essentially a reverse addition fragmentation chain transfer (RAFT) polymerization, a living radical polymerization process.

Many different types of porous particles were functionalized by these processes. In some of the Examples, silica gel was utilized, which were silica gels having 75 micron particle size with median pore sizes of 250, 500, 800, 1000 Å. The silica gels were prepared using the following procedure: 190 g of a 19% sulfuric acid solution was placed in a reactor equipped with an overhead stirrer and chilled to 5° C. Separately, 263 g of a solution of sodium silicate (22.9% SiO$_2$) was also chilled to 5° C. Subsequently, the sodium silicate solution was added to the sulfuric acid solution via a pump at such a rate as to add the full quantity of silicate in 15 minutes. During the addition the temperature was maintained at 5° C. After the addition was completed, the reactor was warmed to room temperature and the contents were allowed to gel without stirring. Upon gelation, the gel mass was cut in small pieces and submerged in water, in order to remove the sodium sulfate formed during the reaction. The level of sodium sulfate remaining in the material was periodically checked, as wash water was drained and fresh water was added to the gel. When the level fell below 1% the gel was suspended in water and the pH of the liquid was adjusted to pH=9.7 and the solution heated to 67° C. The temperature was maintained for 20 hours and 20 minutes. At the end of the heating period the gel was recovered by filtration and dried in a 160° C. oven until the moisture content of the gel was less than about 5% by weight. The silica gel thus obtained had a nitrogen BET surface area of 325 m$^2$/g and a nitrogen pore volume of 1.24 cc/g. Assuming cylindrical pores and using the equation: Pore Size (Angstroms)=40000XPV/SA this material exhibits a pore size of 153 Angstroms. Subsequently, the gel is milled to the desired particle size (75 microns) using an ACM and then hydrothermally treated in an autoclave at 300° C. until the desired pore size is achieved.

The particle sizes reported in the Examples were determined by light scattering using a Malvem Mastersizer 2000 available from Malvern Instruments Ltd. per ASTM B822-10. Pore size distributions are measured by mercury intrusion using an Autopore IV 9520 available from Micromeritics Instrument Corp. Pore volumes referenced herein represent mercury intrusion into pores 10,000 A and below. BET surface areas are also obtained from the nitrogen sorption analysis. Elemental analysis of carbon and sulfur content was conducted using a LECO Carbon and Sulfur Analyzer SC-632 available from LECO Corp. Average molecular weight was determined by GPC analysis using a GPCV 2000 with RI and Viscometric Detection available from Waters Corp. The purity of the silica was measured by inductively coupled plasma (ICP) using an ICPE-9000 available from Shimadzu Corp.

The pore size distribution of the silica gel particles of the present invention was examined by the methods set forth herein. As may be seen from FIG. 3, the porous particles of the present invention possess a broad pore size distribution (i.e., a large relative span).

Figure 4:
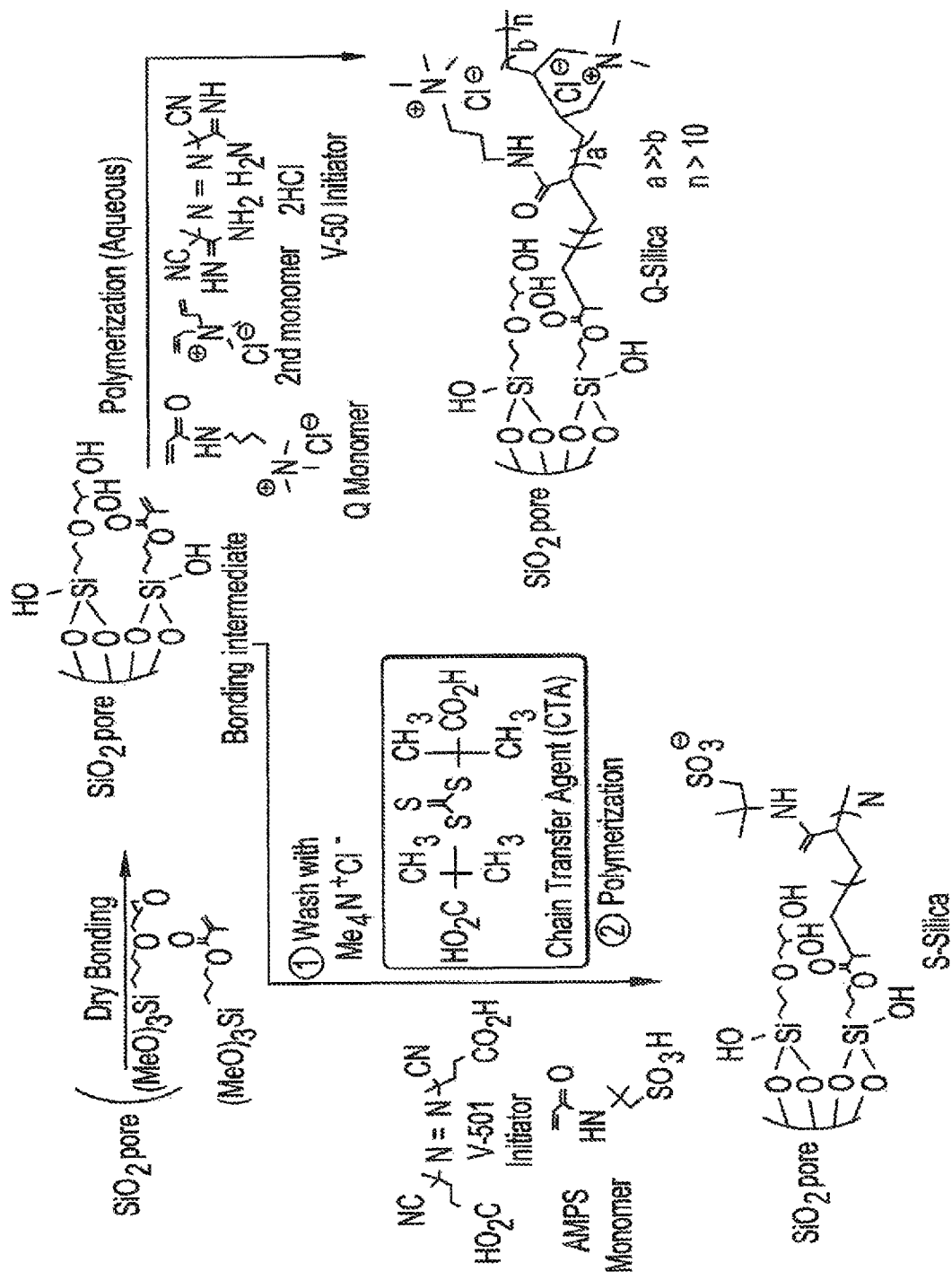
FIG. 4 depicts a reaction scheme of an exemplary embodiment of the chromatography media of the present invention.

FIG. 4 demonstrates general synthetic routes for Q-silica and S-silica.

Molecular weight of the samples from Examples 11-24 were determined using the following procedure: 0.5 grams surface functionalized silica samples were weighted into 50 ml centrifuge tube and 10 ml deionized water were added, followed by 2.2 mls 48% hydrofluoric acid, and after mixed thoroughly, and the samples were let stand 30 minutes. After that, boric acid, 3.5 grams, were added to sequester free fluoride and the samples were placed on wrist action shaker for 60 minutes. After centrifugation and filtration through a 0.2 µm filter with vacuum, clear supernatant were collected for analysis. The supernatants were subjected to gel permeation chromatography (GPC) analysis using a GPCV 2000 with RI and Viscometric Detection available from Waters Corp. that included Ultrahydrogel guard column and 120, 250, and 1000 columns. The solutions from above were injected into 1% aqueous potassium nitrate in mobile phase with a Waters HPLC system equipped with an RI detector. The molecule weights of the solutions were determined by using polyethylene glycol and polyethylene oxide as calibration standards. The molecular weights for the above polymers were below about 200-300 KD.

The static binding tests for Q were performed using Bovine Serum Albumin (BSA) (25 mg/ml concentration in buffer) at a pH of 8.0 with 50 mM Tris HCl buffer. The binding/washing buffer was 50 mM Tris-HCl at a pH of 8.0 and the elution buffer was 50 mM/Tris-HCl/1 M NaCl at a pH of 8.0. Dried silica samples were weighted into vials, and then protein solutions in binding buffer were added. After overnight adsorption, the samples were centrifuged and supernatant separated/discarded. The silica sample was washed three times with washing buffer with centrifugation and separation. After the washing steps, elution buffer was added and the elution was repeated a second time. The UV/Vis adsorption was measured for the combined elution solution at 280 um using a Genesys 10S Bio UV-Vis spectrophotometer available from Thermo Fisher Scientific Inc.

The static binding tests for S were performed using chicken egg white lysozyme or bovine gamma globulin (25 mg/ml concentration in buffer) at a pH of 4.0 with 50 mM HOAc/NaOAc buffer. The binding/washing buffer was 50 mM HOAc/NaOAc at a pH of 4.0 and the elution buffer was 1M NaCl in 50 mM HOAc/NaOAc at a pH of 4.0. Dried silica samples were weighted into vials, and then protein solutions in binding buffer were added. After overnight adsorption, the samples were centrifuged and supernatant separated/discarded. The silica sample was washed three times with washing buffer with centrifugation and separation. After the washing steps, elution buffer was added and the elution was repeated a second time. The UV/Vis adsorption was measured for the combined elution solution at 280 um using a Genesys 10S Bio UV-Vis spectrophotometer available from Thermo Fisher Scientific Inc.

The dynamic binding tests were performed using Omni glass columns with 0.66 cm diameter. For 2 ml of column the column length was around 5.8 cm. Silica samples were de-fined with DI water, and then the column was slurry packed with Akta FPLC and at about 4000 cm/h linear velocity. For the breakthrough curve for Q, BSA protein in pH 8.0 50 mM Tris-HCl buffer (or lysozyme or gamma globulin in pH 4.0, 50 mM HOAc/NaOAc buffer for S) was passing through a column with Akta at about 500 or 1000 cm/h. UV-Vis signals at 280 nm were measured using a UV900 available from General Electric, and chromatograms were recorded and plotted with Microsoft Excel. Dynamic Binding Capacities (DBC) were calculated at 5% breakthrough point using the following equations:

$$DBC = \frac{\left(\begin{array}{c}\text{Volume@ 5\% Breakthrough} - \\ \text{System Volume}\end{array}\right) \times \text{Protein Concentration}}{\text{Column Volume}}$$

Examples 1-10

Samples of initially bonded porous silica particles were prepared by treating the silica particles with treating agent 1 (vinyl silane), which is 3-(trimethoxysilyl)propyl methacrylate, and/or treating agent 2 (epoxy silane), which is (3-glycidoxypropyl)-trimethoxysilane. The vinyl and epoxy silanes were premixed. A round bottom flask charged with porous particles, and the amount of treating agent mix was added into the flask. The mixture was allowed to roll overnight. 0.5M sulfuric acid in the amount of ⅒ of silica (by weight) was added. The mixture was rolled at room temperature for 1 hour, and then was heated up to 70° C. for 1 hour. The flask was allowed to cool down, and then the silica was soaked with 1 M sulfuric acid for 30 minutes, and then filtered. It was then washed with DI water five times, filtered, and dried at 70° C. overnight. The resulting samples were submitted for elemental analysis (LECO) for the percentage of carbon on silica and labeled Examples 1-10, respectively. Results for these examples are recored in Table 1 below:

TABLE 1

| Example # | Particle Size (μm) | Center Pore Size (Å) | Surface Area (m²/g) | Particle Amount (g) | Epoxy Silane Amount (g) | Vinyl Silane Amount (g) | C % initial-bonding |
|---|---|---|---|---|---|---|---|
| 1 | 75 | 1000 | 45 | 100 | 9 | 9 | 2.75 |
| 2 | 75 | 1000 | 45 | 4000 | 240 | 240 | 2.29 |
| 3 | 75 | 1000 | 45 | 200 | 0 | 20 | 3.05 |
| 4 | 75 | 1000 | 45 | 40 | 0.5 | 0.5 | 0.92 |
| 5 | 75 | 1000 | 45 | 100 | 1.2 | 1.2 | 0.77 |
| 6 | 75 | 1000 | 45 | 200 | 2.5 | 2.5 | 0.63 |
| 7 | 75 | 800 | 61 | 200 | 2.5 | 2.5 | 0.82 |
| 8 | 75 | 500 | 72 | 40 | 1.5 | 1.5 | 2.31 |
| 9 | 75 | 500 | 72 | 40 | 0.5 | 0.5 | 0.93 |
| 10 | 75 | 250 | 297 | 150 | 7.5 | 7.5 | 2.42 |

Except for Example 3, equal amount of two silanes were used for these functionalizations and the amounts of carbon obtained were in general proportional to the total amounts of silanes used. In example 3, only vinyl silane was used for the dry bonding. As demonstrated in the above Table 1, the amount of carbon, measured by elemental analysis of the cleaned and dried silica samples after bonding process, was used as an indicator to determine the amount of surface functional groups after surface functionalization.

Examples 11-24

Examples 11-24 describe a process of preparing strong anion exchange materials. In these Examples, the initially bonded silica from Examples 1-10 were surface treated using a first monomer: (3-Acrylamidopropyl)-trimethylammonium chloride (75% aqueous solution); an alternative monomer 1: [3-(Methacryloylamino)propyl]trimethylammonium chloride (50% aqueous solution); an alternative monomer 2: [2-(Acryloyloxy)ethyl]trimethylammonium chloride (80% aqueous solution); a second monomer: Diallyldimethylammonium chloride (65% aqueous solution); V-50 initiator; and additional deionized water (DIW).

A three-necked round bottom flask was equipped with an overhead mechanical stirrer with gas tight fitting, a nitro gas inlet and outlet, and heating mantle with thermal couple feedback. The silica and all the reagents except initiator are first charged into the flask. The system was bubbled with nitrogen for 20 minutes. Then the initiator was introduced. Nitrogen was bubbled for another 20 min before the flask is gradually heated to 65° C. The mixture was kept at 65° C. for 2 hours with overhead stirring, and then cooled down to room temperature. The mixture was poured into 5% NaCl solution in a beaker. The flask was rinsed with DI water to completely move the residual silica inside the flask. After the mixture was stirred with overhead stirrer for a few minutes, it was filtered and the washing was repeated three times with 5% NaCl and three times with DI water. The samples were left in air to dry except that a small amount of silica was dried at 90° C. overnight and then submitted for elemental analysis of carbon content. Binding capacities were calculated for the sample as described herein above. Resulting samples were labeled Examples 11-24. Analytical results and binding capacities for these Examples—were recorded in Table 2 below:

TABLE 2

| Example # | Silica (# from Table 1) | Silica amount (g) | Reagent Ratio (silica/monomer/2$^{nd}$ monomer/initiator/DIW) | C %$_{initialbonding}$ | C %$_{final}$ | (C %$_{final}$ − C %$_{initialbonding}$) | $C_{poly}/C_{initialbonding}$ Ratio | Binding Capacities for BSA protein (mg/ml) |
|---|---|---|---|---|---|---|---|---|
| 11 | 1 | 10 | 1:0.5:0.04:0.0045:6.5 | 2.75 | 4.46 | 1.71 | 0.62 | 70 (D) |
| 12 | 2 | 2000 | 1:0.62:0.043:0.0046:4.0 | 2.29 | 6.24 | 3.88 | 1.72 | 103 (D) |
| 13 | 3 | 60 | 1:0.62:0.043:0.0042:3.33 | 3.05 | 3.05 | 0 | 0 | n/m |
| 14 | 2 | 20 | 1:0.62:0.021:0.005:6 | 2.29 | 6.08 | 3.83 | 1.7 | 83 (S) |
| 15 | 2 | 20 | 1:0.62:0:0.0032:6 | 2.29 | 6.05 | 3.80 | 1.7 | 76 (S) |
| 16 | 4 | 30 | 1:0.82:0.043:0.0046:6.66) | 0.92 | 5.01 | 4.09 | 4.4 | 142 (S) |
| 17 | 5 | 30 | 1:0.83 (alternative monomer 1):0.043:0.046:6.66 | 0.77 | 5.92 | 5.15 | 6.7 | 154 (S); 99 (D) |
| 18 | 5 | 30 | 1:0.83 (alternative monomer 2):0.043:0.046:6.66 | 0.77 | 3.09 | 2.32 | 3.0 | 94 (S) |
| 19 | 6 | 30 | 1:0.82:0.043:0.0046:6.66) | 0.63 | 4.73 | 4.1 | 6.5 | 139 (S) |
| 20 | 6 | 30 | 1:0.83 (alternative monomer 1):0.043:0.046:6.66 | 0.63 | 4.77 | 4.14 | 6.6 | 145 (S) |
| 21 | 7 | 30 | 1:0.82:0.043:0.0023:6.66) | 0.82 | 5.06 | 4.24 | 5.2 | 163 (S); 120 (D) |
| 22 | 8 | 30 | 1:0.82:0.043:0.0046:6.66) | 2.31 | 5.03 | 5.10 | 5.5 | 142 (S) |
| 23 | 9 | 30 | 1:0.82:0.043:0.0046:6.66) | 0.93 | 6.95 | 4.64 | 2.0 | 136 (S) |
| 24 | 10 | 30 | 1:0.75:0.036:0.0033:6.66 | 2.42 | 10.76 | 8.34 | 3.4 | 79 (S) |

Reagent ratio is the amount of reagent used in the reaction by weight. All the monomers used in Table 2 are aqueous solutions so the actual amounts are corrected by multiple by concentration. For example, in Example 11 the amount of reagents are: silica=10 g, monomer=6.6 g, 2$^{nd}$ monomer=0.6 g, initiator=0.045 g, DI water=65 g, and the ratio is calculated as 10:(6.6×0.75):(0.6×0.65):0.045:65=1:0.5:0.04:0.0045:6.5. C %$_{initial\ bonding}$ is the amount of carbon on the dried silica samples after the initial bonding step, as measured by elemental analysis. C %$_{final}$ is the amount of carbon on the purified, dried silica samples, measured by elemental analysis. $C_{poly} = C\%_{final} - C\%_{initial\ bonding}$ is the amount of carbon contributed from polymeric groups on the surface of the silica. $C_{poly}/C_{initial\ bonding}$ Ratio is the division of the two carbon numbers, which is a measure of carbon contributed by the polymer compared to that contributed by the initial bonding. While not wishing to be bound by theory, it is believed that higher ratio is an indication of longer chain polymer with fewer number of chains on the surface, and this is preferred against lower ratio indicating shorter chain with more chains on the surface for higher protein binding as longer chains give more flexibility for the bonded polymers. Bovine serum albumin (BSA) was used as model protein for all the binding tests of samples. Higher binding values are preferred. S stands for Static binding (SBC) where the binding of BSA onto modified silica was measured in a static mode (see the procedure of the measurement below). D stands for dynamic binding (DBC) where the binding of BSA onto modified silica was measured in dynamic flow mode (see the procedure of the measurement below). Note that n/m means not measured.

As may be seen from Table 2, except for Example 13, all of the samples provided acceptable binding results. In Example 13, no polymer attached onto the surface of silica. In Examples 14 and 15, the second monomer, diallyldimethylammonium chloride, provided higher BSA protein binding in general. In Example 16, increasing the ratio of C $\%_{polymer}/C\%_{initial\ bonding}$, the binding of BSA was improved. In Examples 17, 18 and 20, alternative monomers were tested. Alternative monomer 1 gave slightly higher BSA binding than a sample from the first monomer (Example 19), while alternative monomer 2 gave much lower protein binding than the first monomer. In Example 21, the sample was made with silica having a pore diameter/size of 800 Å, which yielded the highest BSA protein binding. Example 22 gave higher BSA binding than 23 because it had higher carbon number ratio. In Example 24, lower protein binding was obtained.

Examples 25-28

Examples 25-28 show another process for preparing a strong anion exchange material. The general procedure for Initial bonding samples for Examples 25-28 (Table 3) was as follows: 50 g of dried silica were mixed with 0.6 g of vinyl silane and 0.6 g of epoxy silane in a dried 1 L round bottom flask on a Rotavap at ambient temperature for overnight (16 hours), and then the silica was transferred to a 1 L beaker and soaked with 500 ml of 1M sulfuric acid for 1 hour. Filtration and washing with 5×500 DI water yielded initially bonded silica samples which were dried at 70° C. overnight.

Examples 25-27

The polymerization process procedure for Examples 25-27 was as follows: Similar to process used in Examples 11-24, 30 g of dried silicas from previous step were mixed with monomers, initiator and water according to Table 3. The analytical results for the final products for Examples 25-27 were recorded in Table 3 as well.

Example 28

The process procedure for Example 28 was as follows: In a 250 ml Beaker the amount of reagents described for Example 28 in Table 3 were mixed. Stir to dissolve everything in water. The solution was poured into a 250 ml Erlenmeyer flask containing 30 g of initially bonded silica (0.76% Carbon). Nitrogen gas was bubbled into the flask for 30 mins (the flask was occasionally shaken to allow silica and aqueous solution mix well), and then the gas tubing was quickly removed and the top of the flasks were sealed with a tape. The flask was gradually heated to 65° C. with a water bath (~30 minutes), and the temperature was kept at 65° C. for 2 hours. Then the mixture was cooled down to room temperature. The mixture was poured into 400-500 ml 10% NaCl solution in a 1 L beaker with some DI water rinsing to completely move the residual silica inside the flask. The silica was stirred with a spatula for a few minutes, and then particles were left to settle. The top liquid phase supernatant was decanted into waste, and the residual silica was mixed with 500 ml 5% NaCl solution. The silica sample was then washed with 3×500 ml of 5% NaCl solution with additional 3×500 mL DI water, each washing was followed with filtration under vacuum. The final sample was left in air to dry except a small amount of sample was dried at 90° C. for elemental analysis of carbon input. The analytical and binding capacity results were recorded in Table 3 below.

TABLE 3

| Examples | Average Pore size (Å) | C % from Initial Bonding | Monomer 1 (g) | Monomer 2 (g) | Initiator (g) | Water (g) | Final C % | Net C % | 5% Breakthrough DSC for BSA Protein (mg/ml) |
|---|---|---|---|---|---|---|---|---|---|
| 25 | 1000 | 0.83 | 33 | 2 | 0.14 | 200 | 4.66 | 3.83 | 115.9 |
| 26 | 2000 | 0.75 | 33 | 2 | 0.14 | 200 | 2.84 | 2.09 | 92.2 |
| 27 | 3000 | 0.77 | 33 | 2 | 0.14 | 200 | 2.47 | 1.70 | 84.4 |
| 28 | 800 | 0.76 | 16.5 | 1 | 0.07 | 100 | 5.49 | 4.73 | 129.1 |

Examples 29-41 demonstrate a process for preparing strong cation exchange materials.

Examples 29-34

Vinyl and epoxy silanes (2.5 g each) were premixed in a 20 ml scintillation vial. A 2 L round bottom flask was charged with 200 grams of D1000 silica, and the amount of treating agent mix was added into the flask drop wise with good mixing. The mixture in the flask was allowed to roll in a rotovap overnight. 20 ml of 0.5M sulfuric acid was added. The mixture was rolled at room temperature for 1 hour, and then was heated up to 70° C. for 1 hour. The flask was allowed to cool down, and then the silica was soaked with 500 ml 1 M sulfuric acid for 30 minutes, and then filtered. It was then washed with DI water five times, filtered. 100 g of tetramethylammonium chloride was dissolved in 1000 ml of methanol and the silica was soaked in this solution for 1 hour, and then the silica is filtered and washed with 3×500 ml of methanol. The silica was dried at 70° C. overnight. The sample was submitted for elemental analysis (LECO) to determine the percentage of carbon on silica. It was found that the sample contained 0.79 g of carbon per 100 g of sample (0.79%). All initial bonding for the Examples 29-34 recorded in Table 4 were prepared as described herein above.

A 500 ml three-necked round bottom flask was equipped with an overhead mechanical stirrer with gas tight fitting, a nitro gas inlet and outlet, and heating mantle with thermal couple feedback. The silica initially bonded and treated with tetramethylammonium chloride (30 g), and 37.5 g of AMPS, small amount of CTA and 200 ml of DI water were first charged into the flask. The system was bubbled with nitrogen for 20 minutes. Then 0.15 g of V501 initiator was introduced. Nitrogen was bubbled for another 20 min before the flask is gradually heated 65° C. The mixture was kept at 65° C. for 2 hours with overhead stirring, and then to 80° C. for another 2 hours. The flask was allowed to cool down to room temperature. The mixture was poured into 600 ml of 5% NaCl solution in a beaker. The flask was rinsed with DI water to completely move the residual silica inside the flask. After the mixture was stirred with overhead stirrer for a few minutes, it was filtered and the washing was repeated three times with 500 ml 5% NaCl and three times with 500 ml DI water. The sample was left in air to dry except that a small amount of silica was dried at 90° C. overnight and then submitted for elemental analysis of carbon and sulfur content.

TABLE 4

| Example # | Pore size of Silica (Å) | Initial C % | CTA used (g) | Final C % | S % | SBC (lysozyme) (mg/ml) | SBC (Globulin) (mg/ml) |
|---|---|---|---|---|---|---|---|
| 29 | 1000 | 0.74 | 0.3 | 2.88 | 0.85 | 153 | 39 |
| 30 | 1000 | 0.98 | 0.3 | 3.47 | 0.77 | 153 | 34 |
| 31 | 1000 | 0.74 | 0.2 | 3.64 | 1.01 | 166 | 19 |
| 32 | 1000 | 0.71 | 0.2 | 3.37 | 1.03 | 160 | 16 |
| 33 | 1000 | 0.74 | 0 | 6.29 | 1.61 | 68 | 2 |
| 34 | 1000 | 0.71 | 0 | 6.26 | 1.61 | 63 | 3 |

In Examples 29-34, chicken egg white lysozyme ($M_W$ of about 17 kD) and bovine gamma globulin ($M_W$ of about 140 kD) proteins were used for static binding studies for the cation exchange materials. The test procedure was the same as that for BSA for Q-Silica described above in Examples 11-24, with the exception that different proteins (still 25 mg/ml concentrations) were used, and the binding and washing buffer was 50 mM HOAc/NaOAc at pH 4.0. The elution buffer was 1 M NaCl in 50 mM HOAc/NaOAc at pH 4.0. Static binding capacities for lysozyme or globulin proteins were summarized in Table 4.

It was found the unlike the Q-silica, the polymerization of AMPS requires the involvement of a small amount of a chain transfer agent (CTA), e.g., S'-Bis($\alpha,\alpha'$-dimethyl-$\alpha''$-acetic acid)-trithiocarbonate. Without CTA, the binding of protein to silica samples were much lower. As can be seen from Table 4, the amount of CTA had significant influence not only on the amount of attached polymer (as measured by carbon and sulfur contents) but also on the static binding capacity of the samples. Larger amounts of CTA led to smaller amounts of polymer attachment, lower binding of lysozyme but higher binding for the much larger size protein Globulin. With no CTA, significantly smaller binding amounts were achieved for both lysozyme and globulin.

Examples 35 and 36

Examples 35 and 36 demonstrate the size of polymers with regard to the amount of CTA used in the polymerization (without involvement of silica). A three-necked round bottom flask was charged with 37.5 g (181 mmol) of AMPS, 1.4 g (18.1 mmol) of methacrylic acid, 0.2 g (1 g for Example 36) of CTA, and 200 ml of DI water. The polymerization was carried out (without silica) similar to the one described above. After the polymerization and sample was submitted for GCP analysis to determine the molecular weight of the polymers made. The $M_W$ for polymers in Example 35 was 87471 and $M_W$ for polymers in Example 36 was 20678.

Example 37

Figure 5:
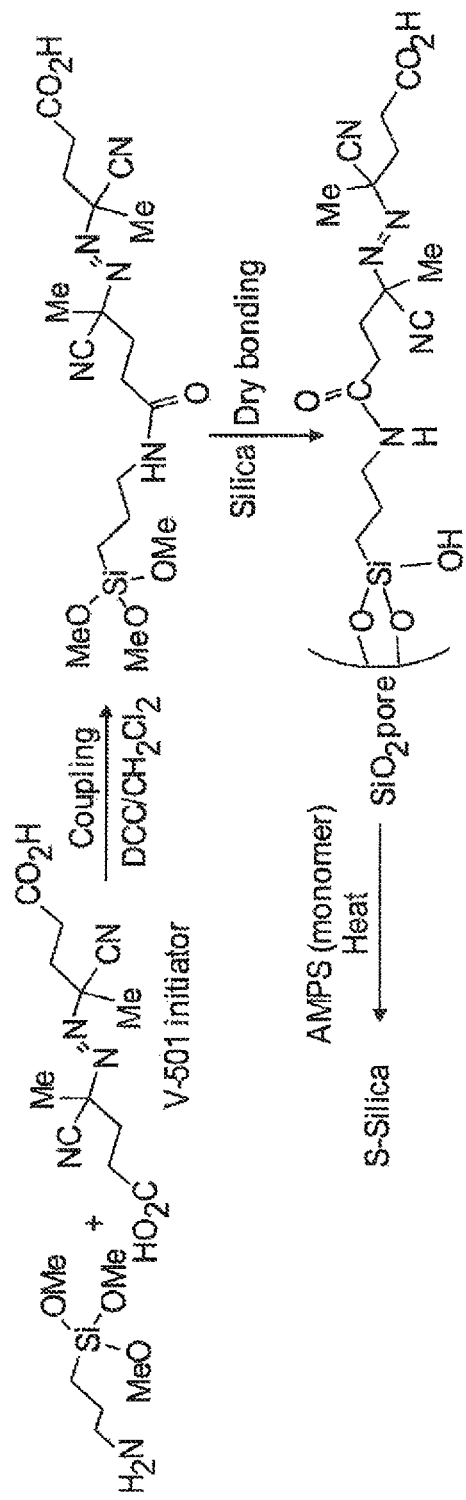
FIG. 5 depicts a reaction scheme of an exemplary embodiment of the chromatography media of the present invention.

In this Example, an alternative process for preparing strong cation exchange phase is presented. The process involves chemically attaching a functional group containing thermally labile azo group and also hydrophilic carboxylic acid groups. As shown in FIG. 5, the azo initiator is first coupled with aminopropyltrimethoxysilane, and then the functional group is bonded with silica. The polymerization proceeds with heat and in the presence of the monomers.

N,N'-Dicyclohexylcarbodiimide (DCC), 11.5 g, was dissolved in 350 ml of methylene chloride, and the solution was cooled with ice batch to about 5° C. To the solution was added 7.78 g of 4,4'-azobis(cyanovaleric acid) (V-501 initiator), followed by 10 g of aminopropyltrimethoxysilane. The mixture was stirred at cold for 3 hours, and then it was allowed to warm up to room temperature in another 2 hours. After the reaction, undissolved solids (mostly urea byproduct) were filtered off, and the filtrate was mixed with 100 g of untreated silica from Example 7 (800 Å). The mixture was place in a 1 L round bottom flask, rolled on a rotovap at room temperature overnight, and then filtered and washed with 4×400 ml of methanol. The solids were allowed to dry in air overnight at room temperature. A small amount of sample was submitted for elemental analysis, and a carbon number of 2.03% was obtained for the sample.

30 g of above silica was mixed with 40 g of AMPS monomer in 200 ml of water. After nitrogen was bubbled in the aqueous mixture for 30 min, the three necked round bottom flask was heated while stirring to 65° C. for 2 hours under nitrogen. After the reaction, the mixture was filtered and washed with 3×500 ml of 5% NaCl and then 3×500 ml of DI water. After the sample was dried, elemental analysis of the dried sample showed a carbon number of 4.23% and sulfur number of 1.17% Static binding of BSA protein (with a pH 4.0, 50 mM sodium acetate buffer) indicated a binding capacity of BSA for this sample was 150 mg/ml.

Example 38

Figure 6:
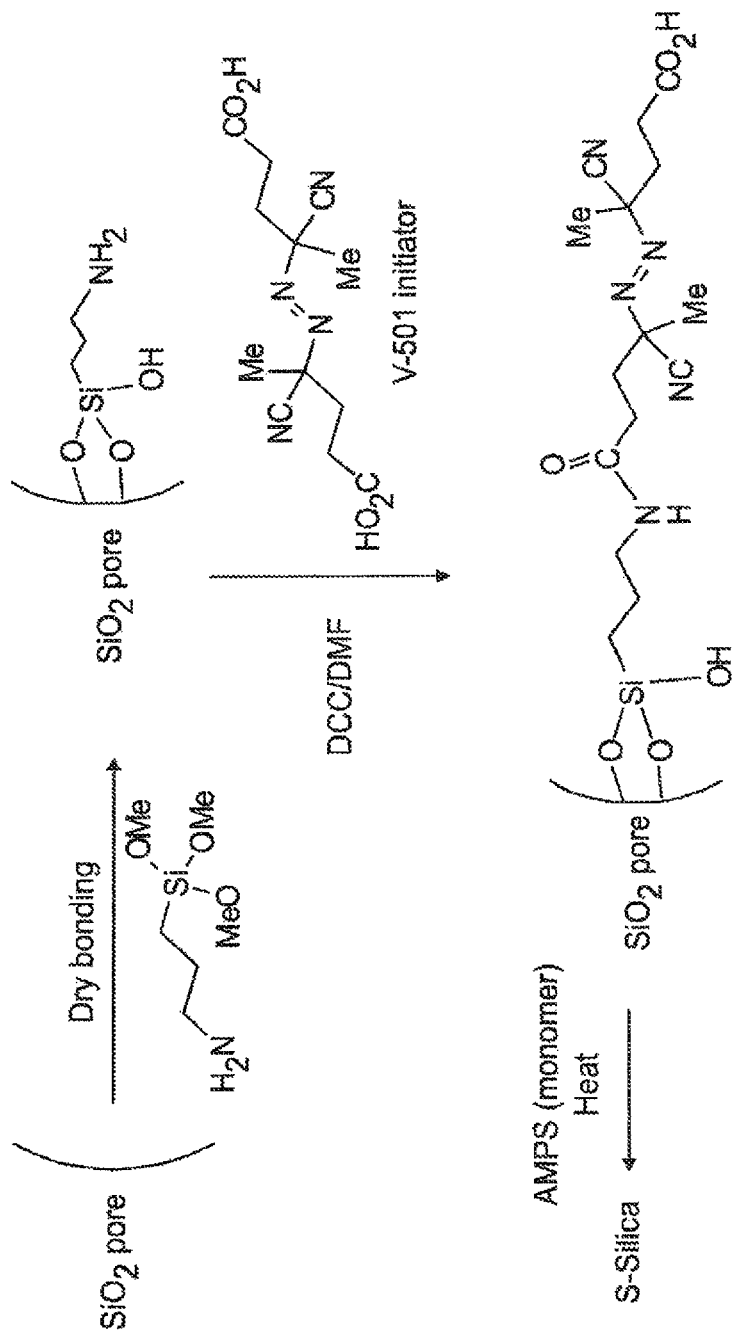
FIG. 6 depicts a reaction scheme of an exemplary embodiment of the chromatography media of the present invention.

In this Example, a different set of reactions was used to prepare strong cation exchange material. As shown in FIG. 6, silica gel was first bonded with aminopropyltrimethoxysilane, and then the modified silica was coupled with azo initiator with a coupling catalysis (DCC) in DMF, followed by polymerization at higher temperature in the presence of AMPS monomer.

D1000 (75 μm average particle size with 1000 Å average pore size), 200 g, was initially bonded with 20 g of aminopropyltrimethoxysilane with a procedure similar to that of Examples 1-10. After overnight rolling, the silica was soaked in 600 ml of 0.1M HCl, and then filtered. Three times of washing with 1 L of DI water were carried out with each step followed by filtration under vacuum. The silica filtration cake was dried at 70° C. overnight and it was determined the amount of carbon with dried silica was at 0.80%.

The dried silica from above, 35 g, was mixed with solution of 1.92 g of DCC, 2.24 g of V-501 azo initiator, and 0.8 g of triethylamine in 100 ml of dry DMF solvent. The mixture was place in a 500 ml round bottom flask and rolled on a rotavap at room temperature for 4 hours. The resulting mixture was filtered and washed with 2×200 ml of DMF, and 2×150 ml of acetone. A sample was dried in oven and elemental analysis showed a carbon content of 1.74% the remaining silica was let dry inside a fume hood at room temperature for 6 hours.

34 g of above silica were mixed with 40 g of AMPS monomer in 200 g of DI water. After the system was flushed with nitrogen for 20 minutes, it was heated while stirring to 65° C. and kept at this temperature for 2 hours. After that, the mixture was cooled down to room temperature, washed with 3×500 ml of 5% NaCl, followed by 3×500 ml of DI water. After the sample was dried, elemental analysis of the dried sample showed a carbon number of 5.47% and sulfur number of 1.69%, and a static binding capacity of 125 mg/ml of lysozyme protein at pH 7.0 (50 mmol phosphate buffer) was obtained.

Examples 39 and 40

Figure 7:
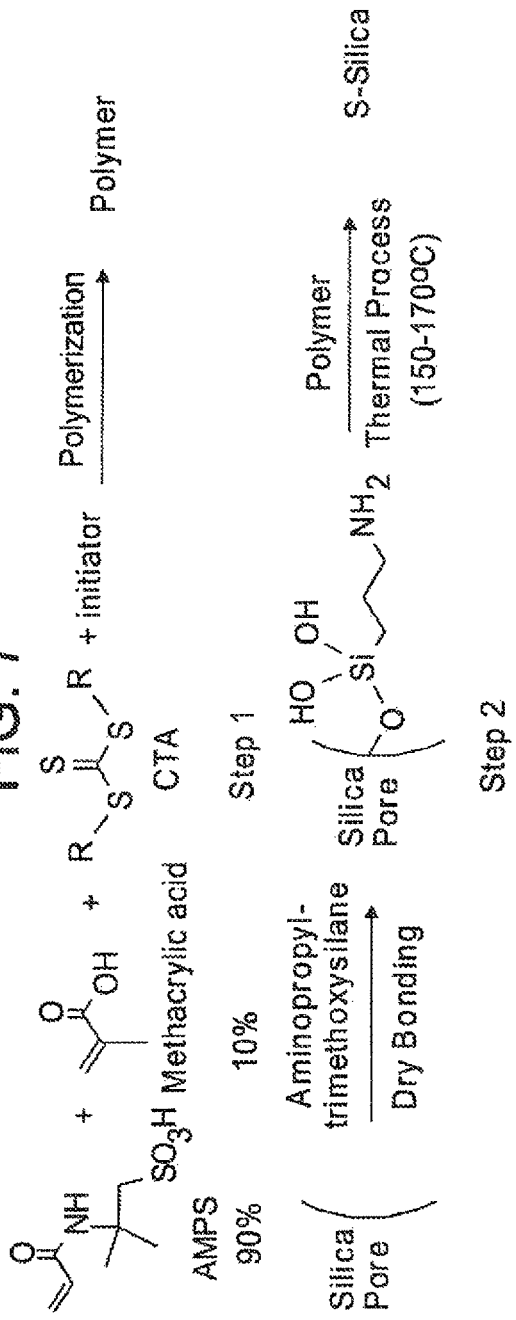
FIG. 7 depicts a reaction scheme of an exemplary embodiment of the chromatography media of the present invention.

In these examples, as shown in FIG. 7, a polymer consisting of AMPS (90 mol %) and methacrylic acid (10 mol %) was first synthesized with a chain transfer agent (Example 39), and then the polymer solution was mixed with modified silica with surface amino groups (initially bonded D1000 silica in Example 38), and then the mixture is baked at 160° C. for several hours to allow the formation of covalent amide bonding between the polymer and the surface amine groups (Example 40).

Example 39

In a 1000 ml three necked round bottom flask (equipped with mechanical stirrer, nitrogen inlet and outlet, and a thermal couple) were added 100 g of AMPS monomer, 4.2 g of methacrylic acid, 1.2 g of CTA, and 600 ml of DI water. The mixture was stirred and nitrogen flashed for 20 min, and then 0.4 g of V-501 initiator was added. After another 20 minutes of nitrogen bubbling, the system was gradually heated to 65° C. and kept for 2 hours, and then to 80° C. for another 2 hours. After cooling down to room temperature, the polymer was analyzed by SEC (using dextrans of different molecular weights as standards) and it was determined that the polymer had $M_W$ of 19417 and the $M_n$ of 15477.

Example 40

The aminopropyl bonded silica from Example 38 (initial bonded), 20 g, was mixed with 200 g of polymer solution as described in Example 39. The mixture was pH adjusted to around 7 with addition of 10 M NaOH. Then it was placed in a ceramic crystallization dish and the dish was place in a Convection oven (Fisher 506G oven) inside a fume hood. The temperature of the oven was set at 160° C. and the sample was baked inside the oven for 6 hours. After that, it was cooled down the room temperature and mixed with 500 ml of 10% NaCl solution. The silica was filtered and washed with 3×500 ml of 5% NaCl solution and the 3×500 ml of DI water. The carbon and sulfur contents of the sample were determined to be 6.06%, 1.70%, respectively. The measurement for lysozyme DBC was 107.6 mg/ml at pH 7.0 (50 mM sodium phosphate buffer).

Example 41

In this Example surface polymer growth was promoted by a Ce(IV) chemistry (U.S. Pat. No. 5,453,186). (See FIG. 8). 100 g of silica (1000 Å median pore size with a median particle size of 70 μm was dry bonded with 10 g of epoxysilane with a procedure similar to examples 1-10 (except that no vinyl silane was used). The resulting silica had a carbon % measurement of 1.69% 30 g of this dried silica were mixed with 30 g of AMPS monomer, and 200 mL of DI water in a three necked round bottom flask. After the mixture was rid of oxygen by bubbling nitrogen for 20 mins, 2.37 grams of cerium (IV) sulfate was added and the mixture was stirred and heated at 70° C. for 2 hours. After 2 hours, the mixture was cooled down, filtered and then slurry washed with 5×300 ml 1 M of nitric acid, followed by 5×300 ml of DI water. Elemental analysis indicated the carbon and sulfur content of the dried sample were 2.27 and 0.58, respectively. DBC measurement of this material with a 2 ml of column at pH 7.0 (50 mL phosphate buffer) for lysozyme was 107 mg/ml.

Examples 42-43

Figure 9:
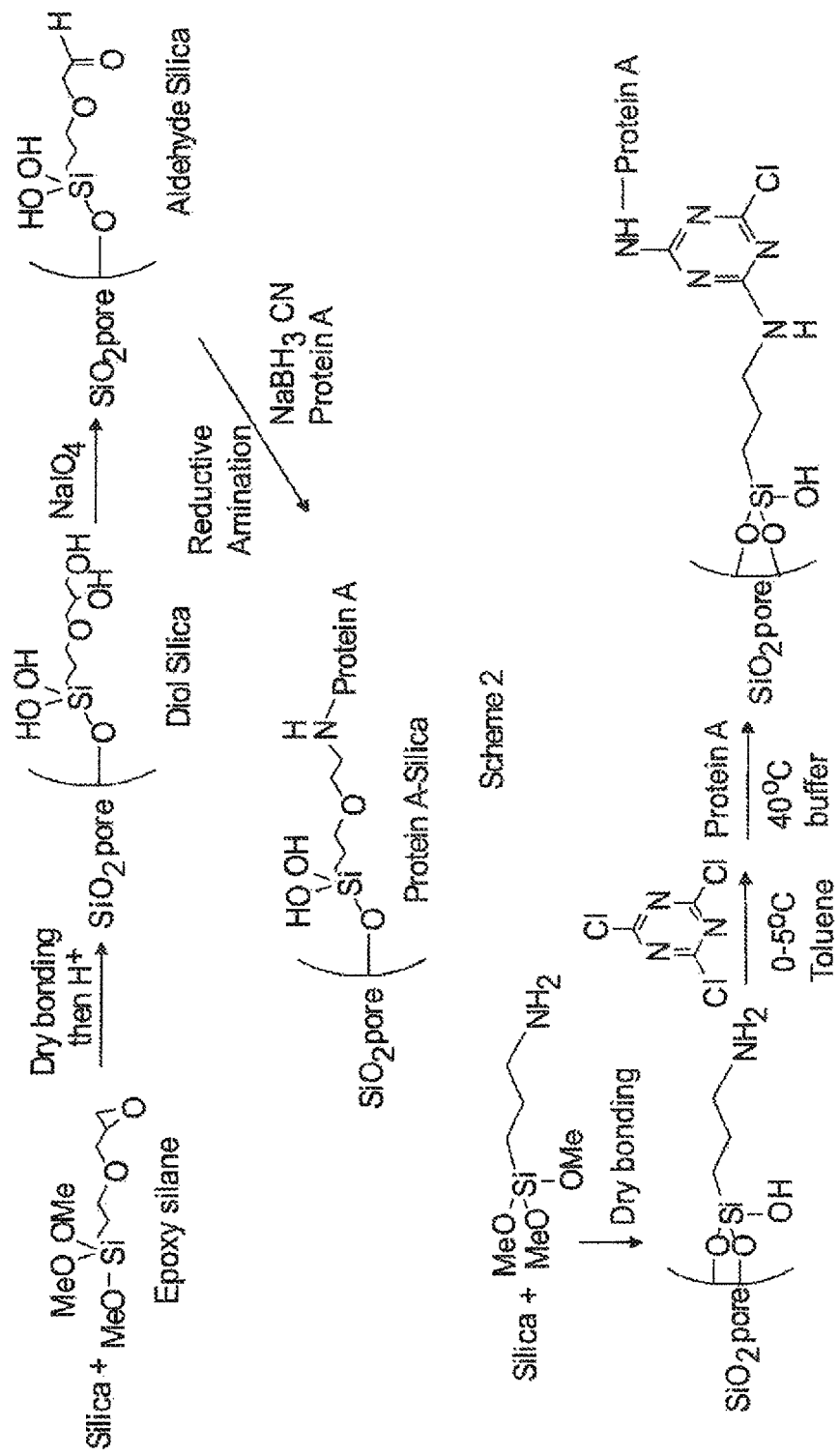
FIG. 9 depicts a reaction scheme for the preparation of an exemplary embodiment of the chromatography media of the present invention.

In Examples 42 and 43, protein A is attached to the silica of Example 1. The silica had a particle size of 75 μm with a median particle size of 70 μm, and a median pore size of 1000 Å. Example 42 used a well known chemistry (e.g., WO199009237) involving oxidation of surface diol group with $NaIO_4$ to yield an aldehyde, followed by reductive amination of amino groups on the protein A chain with the surface aldehyde groups (Scheme 1 of FIG. 9). Example 43 utilized a different chemistry. As shown in Scheme 2 of FIG. 9, the silica was first bonded with aminopropyltrimethoxysilane, and then the amino groups on the surface were reacted with cyanuric chloride in toluene at 5° C. followed by reaction of the second chlorine group with amino groups on the chain of the protein A.

In Example 42, (3-glycidoxypropyl)-trimethoxysilane (75 mg) was bonded with 15 g of the silica from Example 1 (1000 Å) utilizing the initial bonding procedure described in Example 1. After washing and drying, it was found that about 0.18% carbon was attached onto the surface of silica. Subsequently, 1.2 g of this initially bonded silica was mixed with 18 ml of 50 mM HOAc/NaOAc buffer at pH 4.0, with 0.25 M $NaIO_4$ in the buffer. The mixture was shaken at slow rate in a 20 ml scintillation vial overnight at room temperature. Then the silica was washed with 50 ml of DI water five times with filtration, and then washed with 15 ml pH 8 100 mM sodium phosphate buffer containing 50 mM of NaCl. The sample was filtered and about 0.2 g of silica sample was taken for control, and the rest was mixed with 5 g of pH 8 buffer from above, and 400 mg of protein A solution (Protein A was a recombinant Protein A obtained from Repligen Bioprocessing under the trade name rSPA). The sample was shaken at room temperature for 4 hours, and then 0.16 g of $NaBH_3CN$ in 1 ml of above buffer was added. The sample was shaken for another 4 hours. The sample was washed with 5×20 ml of 5% NaCl, followed with 4×20 ml DI water. After drying, thermogravimetric weight loss (TGA at 120-800° C. using a TGA Q500 available from TA Instruments Inc.) was measured for the sample and. control (sample followed the same process without protein A). Results were recorded in Table 5 below:

TABLE 5

| Sample | 120-800° C. TGA Weight Loss |
|---|---|
| Starting Diol silica | 1.28% |
| After reacting with Protein A | 3.30% |
| Same process without Protein A (control) | 1.19% |

The higher amount of weight loss of 3.30% than that of control sample's 1.19% indicates the attachment of protein A.

In Example 43, 50 g of the silica (1000 Å) was bonded with 5 g of Aminopropyltrimethoxysilane utilizing the initial bonding procedure similar to the one described in Example 38. After washing and drying, the amount of carbon was determined to be 2.46% by elemental analysis. TGA weight loss (120-800° C.) was 3.12% Subsequently, 6.7 g of cyanuric chloride was dissolved in 70 ml of anhydrous toluene and the solution was stirred in a three necked round bottom flask, cooled at 5° C. in an ice bath. 22 g of the initially bonded silica and 1.6 g of triethylamine (TEA) was added. The mixture was stirred at cold for 3 hours. Silica was filtered and washed with 3×300 ml acetone, and stored at 4° C. X-ray fluorescence using an Axios mAX Advanced PW 4400 available from PANalytical B.V. showed that the sample contains about 2.12% of surface chlorine, suggesting the attachment of cyanuric chloride. Then, protein A solution, 3.6 g, was dissolved in 50 ml of 50 mM sodium phosphate buffer. The silica from above was added and the mixture was mixed at room temperature overnight. The sample was filtered and washed with 3×500 ml 5% NaCl and 3×500 ml DIW. Control was also run with the same amount of reagents except for the presence of protein A solutions.

As shown in Table 6, TGA of the above samples showed higher amount of heat loss for the sample with protein A reacted, indicating an attachment of the protein.

TABLE 6

| Sample | 120-800° C. TGA Weight Loss |
|---|---|
| Starting Amino silica | 3.12% |
| After reacting with Protein A | 6.70% |
| Same process without Protein A (control) | 4.71% |

Examples 44-46

In Examples 44-46, alternative silica materials were utilized, including a silica gel of Example 10 (250 Å), precipitated silica made by the process set forth in WO2011/144346, and air set silica made by the process set forth in U.S. Pat. Nos. 7,229,655; 6,555,151; 5,149,553; and 6,248,911.

Figure 8:
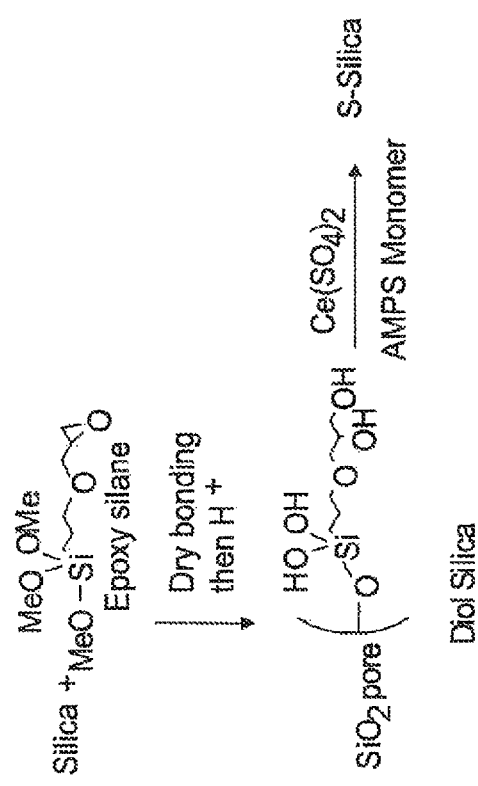
FIG. 8 depicts a reaction scheme of an exemplary embodiment of the chromatography media of the present invention.

Each sample of Examples 44-46 was treated according to the following process. 100 g of silica were added into 1 L indented round bottle flask, and to the silica were added 6.5 g of epoxy silane. The mixture was rolled on a rotovap at room temperature overnight (FIG. 8). Then 10 g of 0.5 M of sulfuric acid was added and the mixture was rolled at room temperature for 1 hr, followed by another 1 hr at 70° C. with a water bath. After the silica was soaked in 500 ml of 1 M sulfuric acid for 30 minutes, it was filtered and washed with 3×500 ml of DI water and 3×250 ml of methanol. After drying, 15 grams of above silica were place into a 300 ml, three-necked round bottom flask, and 80 g of DI water were also added, together with 15 grams of AMPS monomer. The stirred mixture was bubbled nitrogen for 20 minutes, and then 3 grams of cerium (IV) sulfate were added. The mixture was heated to 70° C. for 2 hours, and then silica was filtered and washed with 3×200 ml of IM nitric acid and 3×300 ml of DI water and dried. The properties of the resulting silica were recorded in Table 7 below.

TABLE 7

| Example | Type of Silica | Surface Area (m²/g) | Particle Size (μm) | Median Pore Size (Å) | Average Pore Volume (cc/g) | S %* | Static Binding of Lysozyme (mg/g)** |
|---|---|---|---|---|---|---|---|
| 44 | Silica Gel | 297 | 50 | 250 | 1.1 | 0.59 | 65 |
| 45 | Precipitated Silica | 652 | 10 | 130 | 2.1 | 1.57 | 124 |
| 46 | Air Set Silica Gel | 296 | 47 | 218 | 1.6 | 0.56 | 73 |

*Measured by elemental analysis of dried sample. Higher number indicated higher amount of sulfonic acid groups on the surface
**Measured at pH 5 (50 mM citric acid buffer)

As can be seen from Table 7, the amount of sulfur on the surface of the particles indicated surface functionalization was achieved and also that the functionalized material provided acceptable static binding of lysozyme.

Example 47

In Example 47, the precipitated silica in Example 45 is used, except that the average particle size of the silica was 50 microns. 40 g of the silica were treated with 4 g of vinyl silane and 4 g of epoxy silane using a procedure described in Example 1. The carbon number for the bonded material after the modification was 6.4% Polymerization was carried out with 15 g of modified silica, 12.8 g of Q monomer, 1.2 g of $2^{nd}$ monomer, 70 mg of initiator and 100 g of DI water as done in Examples 11-24. The carbon content after the polymerization was 13.9%

Examples 48 and 49

Figure 10:
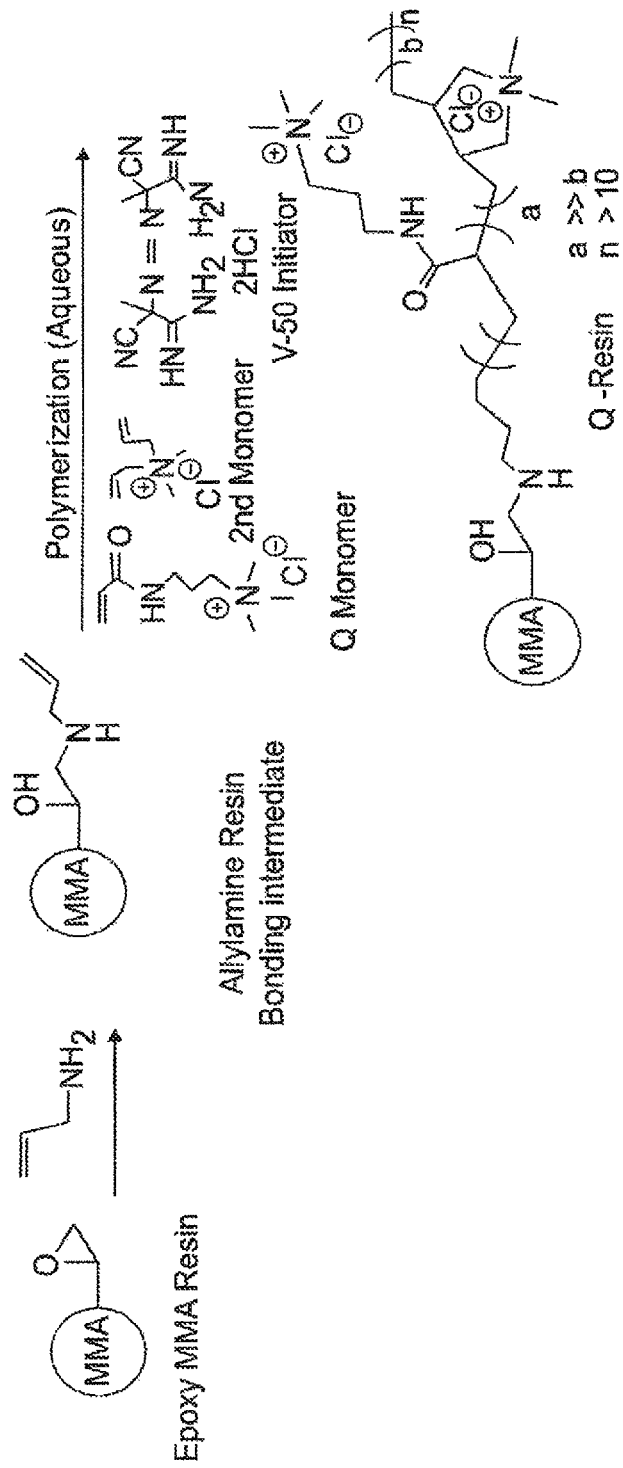
FIG. 10 depicts a reaction scheme for the preparation of an exemplary embodiment of the chromatography media of the present invention.

In Examples 48 and 49, epoxy porous resin (polymethacrylate polymer resin) particles were used (FIG. 10). Since the particles (50 μm or 100 μm average particle size) have epoxy groups (they will be hydrolyzed to give diol groups in aqueous media), only vinyl groups will be needed for the modification with polymerization of Q polymers. Thus, 100 g of the particles were treated with 40 ml of allylamine (available from Aldrich) in 400 ml of NMP at room temperature for 1 hour and 60° C. for 1 hour. After cooling down, the sample was filtered and washed with 3×500 ml of DI water, followed by 500 ml of methanol, and dried in air overnight. The polymerization of 30 g of above modified resin was carried out with the procedure as described in Example 11. As can be seen from Table 8, both examples provided acceptable static binding of BSA protein.

TABLE 8

| Base Particle | Particle Size | C % from polymerization of Q monomers | Static Binding of BSA Protein (mg/g) |
|---|---|---|---|
| Example 48 | 50 | 7.5 | 220 |
| Example 49 | 100 | n/a | 73 |

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% ... 50%, 51%, 52% ... 95%, 96%, 97%, 98%, 99%, or 100% Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

What is claimed is:

1. A chromatography media comprising:
porous inorganic particles having a functionalized surface, said porous inorganic particles comprising silica particles having (i) a purity of at least 93% by weight $SiO_2$ based upon a total weight of the silica particles alone, (ii) a median particle dimension of from about 10 μm to about 120 μm, (iii) a median pore size of at least 300 Angstroms (Å) up to about 6000 Å, (iv) a pore volume of at least about 0.8 cc/g up to about 2.0 cc/g, (v) a pore size distribution relative span of at least about 0.8 up to about 2.0, and (vi) a BET surface area of from about 20 $m^2/g$ to about 2000 $m^2/g$; and said functionalized surface comprises at least one molecule having a molecular weight of greater than about 300 g/mol up to about 500,000 g/mol, wherein said functionalized surface comprises (i) polymer chains covalently bonded to and extending from a particle surface of the silica particles via a first set of functional groups of a first silane, the first set of functional groups enabling polymerization of one or more monomers onto the particle surface via the first silane, and (ii) a second set of functional groups covalently bonded to and extending from the particle surface via a second silane, the second set of functional groups increasing a wettability of the particle surface, wherein said polymer chains are formed from (3-acrylamidopropyl) trimethylammonium chloride or 2-acrylamido-2-methyl-1-propanesulfonic acid.

2. The chromatography media of claim 1, wherein said first silane comprises a vinyl silane and said second silane comprises an epoxy silane.

* * * * *